(12) United States Patent
Bernstein

(10) Patent No.: US 11,443,282 B1
(45) Date of Patent: Sep. 13, 2022

(54) SYSTEMS, METHODS, MEDIA, AND PLATFORMS FOR SOURCING AND RECRUITING CANDIDATES INTO AN INTERVIEW PROCESS

(71) Applicant: RoleBot LLC, Los Angeles, CA (US)

(72) Inventor: Shane Bernstein, Sherman Oaks, CA (US)

(73) Assignee: ROLEBOT, INC., Los Angeles, CA (US)

( * ) Notice: Subject to any disclaimer, the term of this patent is extended or adjusted under 35 U.S.C. 154(b) by 658 days.

(21) Appl. No.: 15/852,612

(22) Filed: Dec. 22, 2017

Related U.S. Application Data

(60) Provisional application No. 62/587,120, filed on Nov. 16, 2017, provisional application No. 62/438,796, filed on Dec. 23, 2016.

(51) Int. Cl.
  *G06Q 10/00* (2012.01)
  *G06Q 10/10* (2012.01)
  *G06F 16/955* (2019.01)
  *G06F 16/9537* (2019.01)

(52) U.S. Cl.
  CPC ....... *G06Q 10/1053* (2013.01); *G06F 16/955* (2019.01); *G06F 16/9537* (2019.01)

(58) Field of Classification Search
  CPC .............. G06Q 10/1053; G06Q 50/01; G06F 16/9537; G06F 16/955
  See application file for complete search history.

(56) References Cited

U.S. PATENT DOCUMENTS

| | | | | |
|---|---|---|---|---|
| 8,595,146 | B1* | 11/2013 | Liew ...................... | G06Q 50/01 705/319 |
| 2002/0072946 | A1* | 6/2002 | Richardson ........ | G06Q 10/1053 705/7.14 |
| 2010/0274815 | A1* | 10/2010 | Vanasco ............... | G06Q 10/107 707/798 |
| 2010/0324970 | A1* | 12/2010 | Phelon ............... | G06Q 10/1053 705/321 |

(Continued)

OTHER PUBLICATIONS

Martineau, Kim. "Location Data on Two Apps Enough to Identify Someone, Says Study". Retrieved at https://datascience.columbia.edu/news/2016/location-data-on-two-apps-enough-to-identify-someone-says-study/. Columbia University Data Science Institute. Apr. 13, 2016.*

(Continued)

*Primary Examiner* — Gabrielle A McCormick
(74) *Attorney, Agent, or Firm* — Greenblum & Bernstein, P.L.C.

(57) ABSTRACT

Various systems, methods, and media for sourcing and recruiting candidates into an interview process are provided. At least one search criterion is received via an interface. A search area of a network is determined based on the at least one search criterion. The search area of the network defines a talent pool. Data from at least one location in the search area of the network is searched based on the at least one search criterion. The data from the at least one location in the search area of the network is aggregated and evaluated to identify at least one candidate from the talent pool. Information of the at least one candidate is displayed or transmitted via the interface. The data includes information displayed at the at least one location, with the data being displayed in association with the at least one candidate.

16 Claims, 30 Drawing Sheets

(56) References Cited

U.S. PATENT DOCUMENTS

| | | | |
|---|---|---|---|
| 2013/0166465 A1* | 6/2013 | Barros | G06Q 10/1053 705/319 |
| 2013/0290206 A1* | 10/2013 | Desai | G06Q 10/063112 705/321 |
| 2013/0340076 A1* | 12/2013 | Cecchetti | G06F 21/6218 726/23 |
| 2014/0143012 A1* | 5/2014 | Alon | H04L 67/22 705/7.29 |
| 2016/0335600 A1* | 11/2016 | Jain | G06Q 10/1053 |

OTHER PUBLICATIONS

D. Rusk and Y. Coady, "Location-Based Analysis of Developers and Technologies on GitHub," 2014 28th International Conference on Advanced Information Networking and Applications Workshops, 2014, pp. 681-685, doi: 10.1109/WAINA.2014.110.*

* cited by examiner

Simplified JD
Add LI team members (secondary) – per Role
- Based on Comparable shops (ie companies, environments, benchmark skillset level)
- Social Profiles (ie LI, Github, StackOverflow, Twitter, etc...)

Top 3:
1. Java/J2EE
2. Spring
3. Javascript # of Min Years – professional experience: 5
Industry (or similar): high traffic
Companies like: Google, Amazon, Blackline
Competitors: Internet Brands, Evolve Media
Non Singular Keys: Node.JS, backbone, Angular, Web Developer
Select # of resumes you wish to view: 20

FIG. 3

Job Boards: CareerBuilder, Monster, Dice, Craigslist, ZipRecruiter, Indeed, SimplyHired
- indiscriminate – anyone can apply, and time & bandwidth prevent us from success (3 Java pic)
- most resumes succumb to the infamous "black hole"

Recruiters: Corporate/Onsite, HR, Office Manager, 3$^{rd}$ Party, Consultants
- lack of training ie specific nuances & expertise, ownership, motivation, effort & time (= $$$)
- 90% are reactive "inbound resumes", 10% proactive or "outbound"

Employee Referrals: all employees
- $1K - $5K incentive cost – strong employee relations / organic brand ambassadors
- Likeminded talent, but limited availability
- Good tool, but not a turnkey & timeless solution

Hiring Managers: Best in Class Solution
- Most effective, SME's, understand the environment, the expectations and the desires, however are paid to do their day-to-day job, and don't have the bandwidth to find and recruit new employees, or the expertise to go out and network, market to prospects;

Freelance Job Boards: UpWork, Toptal, Freelancer, Elance, Guru, 99Designs
- Hiring manager insecurity, uncertainty, too many to choose from – which one?

Hybrid Job Board-MEETS-Social Networking: LinkedIn, Facebook, Twitter
- No different than job boards, except open to the public (or those who pay high fees)
- Oversaturated (everywhere you look, which becomes white noise, how do you differentiate)
- a Sales Team's Dream – instant access to solicit anyone at any time, multiple times

Hybrid Aggregators: Entelo (acquired by LinkedIn), TalentBin (acquired by Monster)
- started off in the right direction – early stage aggregators, but required operators/recruiters
- Recruiters/Operators must have expertise to be effective (90% are not)
- Major job-site players are threatened, acquiring these platforms and squashing the value-ads

Career Marketplace Sites: Hired.com, Elevate Careers (by eHarmony)
- Very selective/country club model – client &/or prospect, high costs
- incentives offered to keep both sides intact
- economically impacted – only successful in employees' market / not a timeless solution

ATS: Jobvite, Resumator, Greenhouse, Lever, Taleo
- applicant tracking systems - collects & tracks incoming candidates' resumes, dates, contact info
- Most recruiters do not search "backwards", meaning candidates in current database are never followed up with, only new candidates are reviewed & considered
- UEX is a mixed bag, no one platform is perfect, not a lot of value-ad

Company Career Sites: Most Companies
- legitimizes a company and publicizes possible open roles – most are not updated in real time
- companies post mock roles to build a pipeline, and not well managed if at all

FIG. 4

Harry Smith
Status: Active
Verified: Yes

UPGRADE TO BE LISTED 1st

*(may not affect order, but in some cases it will)(May serve Ads – more vendor based on their skill)*

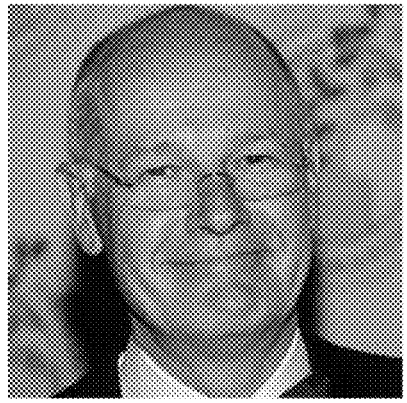

Top 3:
1. Node.JS
2. Python
3. Jeans & Sneakers

Code Score(FICA): (Behind the scenes quantifier) compared to mainstream
Design Score: (behind the scenes quantifier based on portfolios/samples) compared to mainstream Hobbies:
Looking for:
Progression: multiples picklist Social Media Profiles:
LinkedIn:
GitHub:
Blog:
Twitter:
Skype:
Facebook:
Tumblr:
Portfolio:
Resume/PDF:
Google+:
Lanyrd.com/profile/rwaters/
Indeed Resumes – ie: (major source of profiles & credentials)
http://www.indeed.com/r/Akanksha-Jain/f8cdc072a7af5d91?co=US About.me:
Stack Overflow:
Quora:
Gravitar:
Cargo Collective:
Dribble:
Coroflot:
Behance:
Carbonmade:
Dribbble:
Contently:

Mobile UI – end user receives:

FIG. 7

Overview:

- Web & Mobile SaaS-based Recruitment Automation Sourcing (or Qualification) tool
- Simple Workflow & UEX – HR/Recruitment/Hiring Manager Access / Web & Mobile Friendly
- Instead of a person applying for job on a traditional Job Board; What if the job applied for the person – directly from the company or hiring manager; (aka a Reverse Job Board)
- Reverse Job Board leveraging Big Data
- Localizing Recruitment down to the hiring manager / team / specific role
- Simplified Job Description
- No haggling, targeting the right candidates for the role & the team – based on role requirements and social networking including ranking/scoring factors; Covering the entire web, not limited to LI only; Ease of Use & Simplistic UI; Multiple Bots at once, full control, interdepartmental transparency & multiple-user access;
- B2C (talent)
    - End User can create a profile and have an updated resume, add any social media profiles – social & professional, references, pass colleagues, list most notable projects, major accomplishments, hobbies, current geo/location, code samples, portfolio, tech stack, career interests and company types, email address; current salary/hourly range
    - And finally – Active / Passive / Off the Grid; (Mobile Accessible)
        - Nobody can access it – no vendors, no recruiters;
        - Server will access if you're right for the role and share based on your status; Closed Network; you can add geography, tech stack, company size, basic info on what you want; Will never be pinged, unless role aligns; Ability to opt out;
- B2B (company – Hiring Managers/HR/Recruitment)
    - Simple JD – Top 3 Skills/Responsibilities
    - Hiring Manager & Team Members' Connections (across all web channels)
    - Geography = this will allow server to find someone in specific area/radius
    - Company Blurb (selling points – ie team/hiring manager background/specific projects or deliverables)
    - Salary Info / Bonus / Equity if applicable;
    - Behind the Scenes: Direct access for the hiring manager, HR & Recruitment; customizable logins depending on hiring workflows of each company;
    - Providing full visibility & control to the hiring manager, while providing full transparency to HR;
- Who can use system: any company in the world (sign up with ease, no long term commitment)
- Analytics on caliber of tech shop / Individual candidates' demographics
- Access to any ATS/CRM (through API)

FIG. 8

Features & Objectives

- "Actions speak louder than words"
- Add verifiable skills, community contribution & participation, team dynamic (smart technology);
- B2B Internal Sourcing Automation Tool - utilizing relationships, skillset, experience level, accomplishments, industry background, mutual contacts, culture, reputation ranking, projects, goals, portfolio & code samples, social data, internet chatter & similarities;
    - Quantifying business/personal relationships, subcultures & similarities across the entire web;
    - Quantifying quality of code utilizing the open source community
    - Quantifying accomplishments, responsibilities, scope of work and company goals
    - Quantifying portfolio/visual & UI/UX design samples vs company norms
    - No key word matching
    - We're looking to find someone to fill a ROLE not just do a job;
- Provides a massive opportunity to a company that will cover the entire circumference of the internet from axis to axis; Utilizing & encompassing the the entire world wide web/internet, it doesn't discriminate, it searches every nook and cranny, *LI becomes nothing but a subset of the job market;*
- Utilizing machine learning/data science to train the bot on individual hiring manager likings, company backgrounds/cultures, past user history – likes/dislikes, etc...what is passed on/accepted by user (hiring manager), based on acceptance/decline patterns, et...
- Will curate next batch of ideal candidates; Per Role per Team in Real Time; Next Year, new role, new team in real time; Tomorrow, new role, new team in real time;
- Any new resume or profile that pops up, or college grad that adds a resume or opens a profile somewhere on the internet will be automatically included and indexed in roleBOT***
- When hiring a candidate, it's often not what is communicated in an interview, it is what is portrayed before and after the interview that has the most impact in the hiring decision; To our point – it's the unsolicited portrayal of a person you are after;
- The best candidates are found by targeting or poaching, ie being Pro-Active.
- What if instead of receiving resumes via a job posting, and have to sift through 100's of 1000's to find a select few, company instead has each hiring manager input a role (very specific) into the portal and it finds the candidates you want; this way you only sort through the ones you are targeting; Think of the JD as having a mind of its own....think of the JD as role with it's own recruiter brain
- why not capture what people are doing (meetups), saying (twitter/blogger/personal blogs), seeing (instagram/snapchat, pinterest), hanging with (facebook), developing (github), creating (dribble, behance) in their natural settings through data open to the public via the internet;

FIG. 9A

Features & Objectives (continued)
- Capture Internet Chatter across all channels to pinpoint job seekers that are looking for new opps – quantifying negative chatter/positive chatter/workplace unrest or discrepancies among workforces;
- We become aggregate of data on internet for companies seeking jobs
- Ranking the company's current code base (check out Codalytics, but for open source community code base) – provides a benchmark;
- All Candidate Profiles are closed to public, only touched by Algorythm; (may include ads, or premium upgrades, but no outside recruiters/companies/people can browse or search)
- Heavy Mobile – Native Apps – iOS & Android – free to download; App will be very simple:
    - 3 Buttons - ACTIVE / PASSIVE / HOLD;
    - Refer a Friend; (income earning potential)
    - List view of opps in Queue - able highlight and see manager info and basic blurb, etc...
    - Can choose to PASS or ACCEPT NEXT STEPS;
    - Texting will also be an option if Mobile app is not accessible / no Smartphone;
    - Can VERIFY profile once indexed – automatically will receive a text, email or message via native mobile app
- To incorporate all social media outlets, would prefer to utilize their sites at the communication middle layer – allowing end user to receive messages through their channels from RB;
- Add & Responsive Design after "app will be simple"
- Add Agnostic Messaging Platform for all candidate communications
- Build an app to grab all new resumes/and new LinkedIn, Facebook, Twitter, StackOverflow, etc. profiles that are created in real time – send to a spreadsheet – ADD-ON or separate app; (CRM premium tool)
- The UEX Tariff – could be in form of points – Jason mentioned a points apps/company that you can tally and put towards bigger gift cards, etc....vs smaller cards;
- A good initial marketing play would be to build the mobile app to appeal to all college tech grads, sign up for the service, role bot will find you the next opp; (ie http://www.schoold.co/); Want all new grads listed/searchable (look up by school if possible or emails by .edu)
- Tag – not sure if you knew, but Shane Bernstein works for us, looks like you may have worked with each other in the past, or reported to him, would love to chat about this new opp (using the matching technology)

FIG. 9B

Features & Objectives (continued)
- Deep Web / Dark Web – indexing for technology whitepapers, books, anything that does not exist in traditional indexing/internet search (ie Google);
  https://en.wikipedia.org/wiki/List_of_academic_databases_and_search_engines
  http://citeseerx.ist.psu.edu/index;jsessionid=16451C96DFB63F5503D7B659B5A6D161
  https://archive.org/web/
  https://aminer.org/          ***
  http://adsabs.harvard.edu/
  http://liinwww.ira.uka.de/bibliography/Misc/Bibnet/
  https://www.scientillion.com/
  http://ieeexplore.ieee.org/Xplore/home.jsp
  https://sourceforge.net/projects/dbl-browser/
  http://arxiv.org/
  http://liinwww.ira.uka.de/bibliography/

FIG. 9C

Workflow

1. Hiring Manager → Talent Pool (Scored by Community Contribution & Participation, Mutual Relationships & Team Dynamic, Skill Aptitude and Interview progression & reputation)
    a. *B2C Mobile Platform ($3^{rd}$ phase buildout) – SKIP to Step 2*
        - *Mobile only – verify data/web profiles/include accomplishments*
        - *Authorize frequency – choose when to be Active, Passive or Unavailable*
        - *Imagine never having to look for a job again, ever…..*
        - *No more Resumes*
        - *Confidential & Private Recruitment Engine*
        - *Spur the "Interview Economy"*

2. Talent Pool→ Responds favorably/declines, asks questions, or agrees to $1^{st}$ Phone Interview 3. Interview Automation – Scheduled & Confirmed 4. Feedback is shared on RB after completed phone interview – from both sides;

5. Managers' proceed to next steps in hiring process – if applicable;

6. Analytics (collected & correlated to measure predictive analytics, user behavior patterns, machine learning & achieve progressive smart hiring algorithm)

7. Humans Hire

FIG. 10

Current "Breakdown" in Sourcing

*Unverifiable, unreliable, inaccurate & inconsistent results*

- Key Word Search
- Assessment Tests
- Internal referrals
- In-House Recruiters
- Job Postings / LinkedIn
- 3rd Party Recruitment Agencies

FIG. 24

The Solution
Verifying talent pool is actually qualified

- Leveraging Verifiable Skills, Relationship Synergies & Community Evangelism

- ML & NLP Intelligent search algorithms utilizing actionable data

- Empowering talent pool to share proven accomplishments & career validation

- Encompassing up to millions of candidates in any given unique search string

- Connecting with talent where they hang out using mobile messaging

FIG. 25

SYSTEMS, METHODS, MEDIA, AND PLATFORMS FOR SOURCING AND RECRUITING CANDIDATES INTO AN INTERVIEW PROCESS

CROSS-REFERENCE TO RELATED APPLICATIONS

This application claims the benefit of U.S. Provisional Application Nos. 62/438,796, filed Dec. 23, 2016 and 62/587,120, filed Nov. 16, 2017, the contents of which are incorporated herein in their entireties.

BACKGROUND

1. Field of the Disclosure

The present disclosure generally relates to the field of employee recruitment and hiring. More particularly, the present disclosure relates to various systems, methods, media, and platforms for sourcing and recruiting candidates into an interview process.

2. Background Information

In the current job market, one typically finds a job by applying to a job posting, getting a job through a friend or peer, being recruited by an onsite corporate recruiter, being recruited by a third party recruitment agency, updating profiles on social media channels and networks, networking, or meeting someone by chance at a restaurant and being offered a job. Companies typically find talent by posting a job description on a job board, asking current employees for referrals, hiring corporate onsite recruiters to spread word, hiring third party staffing agencies to recruit, searching far and wide for a technology, or crossing their fingers and hoping to land employees based on reputation. FIG. 24 shows traditional means for sourcing talent including conducting key word searches, giving assessment tests, receiving internal referrals, utilizing in-house recruiters, job postings, and using third party recruitment agencies. The traditional means provide unverifiable, unreliable, inaccurate, and inconsistent results.

The traditional means do not provide any barrier to application, and the contents of an application, such as a resume, are unverified. In this regard, in-house recruiters lack the bandwidth and domain expertise to sort and verify applications. Approximately 65% of costs and time occur during the "sourcing" phase of the traditional means. Also, the "sourcing" phase, as well as subsequent phases, may require days, weeks, or even longer periods of time. As a result, companies are frequently looking for alternative means for finding talent.

According to an article published on USNews.com in 2015, 14% of new hires are employee referrals for companies with ninety-nine employees or less, 24% of new hires are employee referrals for companies with one hundred to nine hundred ninety-nine employees, and 27% of new hires are employee referrals for companies with at least one thousand employees. According to an article published on SHRM.org in 2016, about four in ten (39%) of nearly four thousand corporate talent acquisition managers from forty countries agreed that quality of hire is the most valuable metric for performance. In this regard, improved methods for locating quality talent are desired besides employee referrals, especially since, according to CompData's 2015 edition of their annual BenchmarkPro Survey, the total turnover across all industries was 16.7%.

SUMMARY OF THE DISCLOSURE

The present disclosure, through one or more of its various aspects, embodiments, and/or specific features or sub-components, provides, inter alia, various systems, servers, methods, media, programs, and platforms for sourcing and recruiting candidates into an interview process. The various aspects, embodiments, features, and/or sub-components leverage and aggregate big data from across the web, allowing the prospective employers to directly target and recruit qualified talent instantly, leveraging verifiable and action-based aptitudes and skillsets.

According to an aspect of the present disclosure, a system for sourcing and recruiting candidates into an interview process is provided. The system comprises a processor and a memory. The memory includes instructions that, when executed by the processor, cause the processor to perform operations. The processor receives at least one search criterion via an interface. A search area of a network is determined based on the at least one search criterion. The search area of the network defines a talent pool. Data from at least one location in the search area of the network is searched based on the at least one search criterion. The data from the at least one location in the search area is aggregated and evaluated to identify at least one candidate from the talent pool. Information of the at least one candidate is displayed or transmitted via the interface. The data includes information displayed at the at least one location, with the data being displayed in association with the at least one candidate.

According to another aspect of the present disclosure, the search area of the network is further determined based on a geographic location.

According to yet another aspect of the present disclosure, the data from the at least one location in the search area of the network is evaluated based on a sliding scale relationship with the geographic location. Portions of the talent pool being further from the geographic location are evaluated for higher qualities than portions of the talent pool being closer to the geographic location.

According to a further aspect of the present disclosure, the system includes a database that stores the at least one location in the search area of the network. The at least one location is stored in the database in advance of the searching of the data from the at least one location.

According to still a further another aspect of the present disclosure, the databases stores at least one application programming interface for the at least one location in the search area of the network. The at least one application programming interface facilitates the searching of the at least one location for the data.

According to another aspect of the present disclosure, after identifying at least one candidate from the talent pool, a profile of the at least one candidate is determined. A previously unidentified location of the network is determined from the profile of the at least one candidate. The previously unidentified location relates to the at least one search criterion, and the database is updated to store the previously unidentified location of the network.

According to yet another aspect of the present disclosure, the database is updated to store the previously unidentified location of the network in association with a tag based on the at least one criterion.

According to a further aspect of the present disclosure, the database is updated to store the previously unidentified location of the network in association with a priority score or a temporary label. The priority score is increased or the temporary label is removed in response to identifying an additional candidate which has an additional profile which identifies the previously unidentified location of the network.

According to still a further another aspect of the present disclosure, the database stores the at least one location as a domain name, hostname, uniform resource locator, or website.

According to another aspect of the present disclosure, members or users of the at least one location in the search area of the network are identified, with the talent pool being defined as the members or the users of the at least one location in the search area of the network.

According to yet another aspect of the present disclosure, the members or users of the at least one location are filtered or limited based on the at least one search criterion or a geographic location. The data from the at least one location in the search area of the network is search based on the at least one search criterion and a filtered or limited set of the members or users.

According to a further aspect of the present disclosure, timestamps associated with pieces of the data searched from the at least one location are identified. In the aggregating and evaluating, the pieces of data are filtered or grouped based on the timestamps.

According to still a further another aspect of the present disclosure, geotags or metadata associated with pieces of the data searched from the at least one location are identified. In the aggregating and evaluating, the pieces of the data are associated with members of the talent pool based on the geotags or metadata.

According to another aspect of the present disclosure, the data searched from the at least one location is evaluated based on a plurality of pillars.

According to yet another aspect of the present disclosure, the pillars include a self-score pillar, a skill set pillar, a community pillar, and a relationship pillar. The at least one candidate is selected based on scores in each of the pillars. The self-score pillar is determined from a profile of the at least one candidate. The skill set pillar is determined based on the data searched from the at least one location which relates to abilities of the at least one candidate. The community pillar is determined based on the data searched from the at least one location which relates to interactions between the at least one candidate and other members or users of the at least one location. The relationship pillar is determined by connections between the at least one candidate and employees of an employer to which the at least one search criterion relate.

According to a further aspect of the present disclosure, the at least one search criterion is received from a hiring manager via the interface, and an interview between the hiring manager and the at least one candidate is arranged.

According to still a further another aspect of the present disclosure, the at least one location in the search area of the network is searched, based on the at least one search criterion, for at least one of publications, speaking engagements, questions posted, questions answered, code posted, ratings, achievements, or abilities of the talent pool.

According to another aspect of the present disclosure, the information that is displayed at the at least one location in association with the at least one candidate includes actions of the at least one candidate within the location of the network.

According to yet another aspect of the present disclosure, a method for sourcing and recruiting candidates into an interview process is provided. The method receives, via an interface, at least one search criterion. A search area of a network is determined, by a processor, based on the at least one search criterion. The search area of the network defines a talent pool. The method searches data from at least one location in the search area of the network based on the at least one search criterion, and aggregates and evaluates the data from the at least one location in the search area of the network to identify at least one candidate from the talent pool. Information of the at least one candidate is displayed or transmitted. The data includes information displayed at the at least one location, with the data being displayed in association with the at least one candidate.

According to a further aspect of the present disclosure, a non-transitory computer-readable medium including a set of instructions for sourcing and recruiting candidates into an interview process is provided. The set of instructions, when executed by a computer, causes the computer to perform operations. The operations include: receiving at least one search criterion via an interface; determining a search area of a network based on the at least one search criterion; searching data from at least one location in the search area of the network based on the at least one search criterion; aggregating and evaluating the data from the at least one location in the search area of the network to identify at least one candidate from a talent pool; and displaying or transmitting information of the at least one candidate via the interface. The search area of the network defines the talent pool. The data includes information displayed at the at least one location, with the data being displayed in association with the at least one candidate.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 3 shows an exemplary job description of a system for sourcing and recruiting candidates into an interview process.

FIG. 4 shows an exemplary embodiment of a current recruitment ecosystem.

FIG. 7 shows a further exemplary embodiment of a candidate profile for a system for sourcing and recruiting candidates into an interview process.

FIG. 8 shows an exemplary list of effects of an embodiment of a system for sourcing and recruiting candidates into an interview process.

FIGS. 9A, 9B, and 9C show an exemplary list of features and objectives of an embodiment of a system for sourcing and recruiting candidates into an interview process.

FIG. 10 shows an exemplary workflow of a system for sourcing and recruiting candidates into an interview process.

FIG. 24 shows an exemplary list of traditional means for sourcing and recruiting talent.

FIG. 25 shows an exemplary solution for verifying a talent pool.

DETAILED DESCRIPTION

The present disclosure provides various embodiments for verifying whether a talent pool is actually qualified. As shown in FIG. 25, the various embodiments leverage verifiable skills, relationship synergies, and community evangelism. The embodiments employ machine learning (ML) and natural language processing (NLP) intelligent search algorithms which utilize actionable data. The embodiments empower talent pools to share proven accomplishments and career validation. The algorithms encompass up to millions of candidates in any given search string, and connect with the talent where it hangs out using, among others, mobile messaging. Thus, through one or more of its various aspects, embodiments and/or specific features or sub-components of the present disclosure, is thus intended to bring out one or more of the advantages as specifically described above and noted below.

Figure 1:
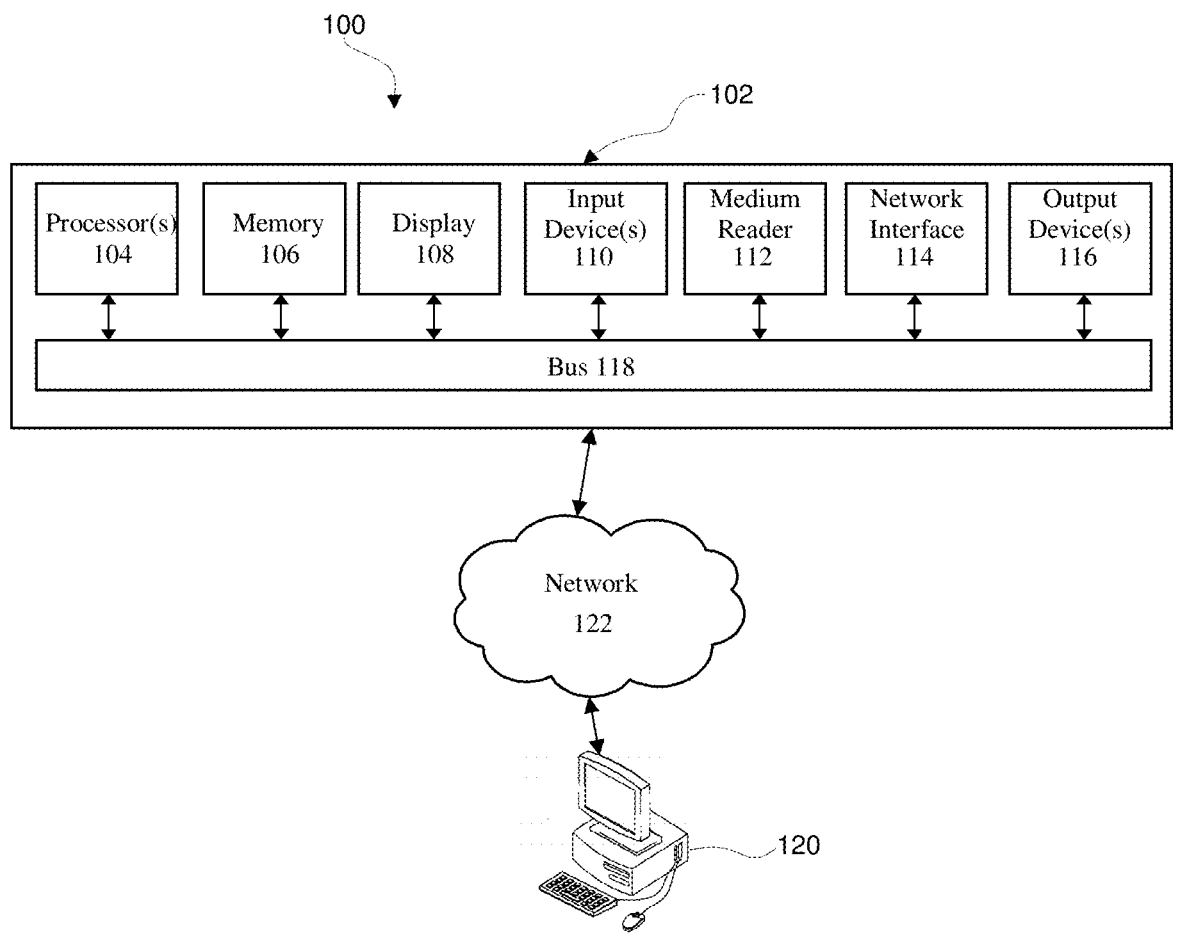
FIG. 1 illustrates an exemplary system for sourcing and recruiting candidates into an interview process.

FIG. 1 is an exemplary system for use in accordance with the embodiments described herein. The server 102 is generally shown and may include a computer system 102, which is generally indicated. The computer system 102 may operate as a standalone device or may be connected to other systems or peripheral devices. For example, the computer system 102 may include, or be included within, any one or more computers, servers, systems, communication networks or cloud environment.

The computer system 102 may operate in the capacity of a server in a network environment, or the in the capacity of a client user computer in the network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 102 is illustrated, addition embodiments may include any collection of systems or sub-systems that individually or jointly execute instructions or perform functions.

As illustrated in FIG. 1, the computer system 102 may include at least one processor 104, such as, for example, a central processing unit, a graphics processing unit, or both. The computer system 102 may also include a computer memory 106. The computer memory 106 may include a static memory, a dynamic memory, or both. The computer memory 106 may additionally or alternatively include a hard disk, random access memory, a cache, or any combination thereof. Of course, those skilled in the art appreciate that the computer memory 106 may comprise any combination of known memories or a single storage.

As shown in FIG. 1, the computer system 102 may include a computer display 108, such as a liquid crystal display, an organic light emitting diode, a flat panel display, a solid state display, a cathode ray tube, a plasma display, or any other known display.

The computer system 102 may include at least one computer input device 110, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 and a network interface 114. Furthermore, the computer system 102 may include any additional devices, components, parts, peripherals, hardware, software or any combination thereof which are commonly known and understood as being included with or within a computer system, such as, but not limited to, an output device 116. The output device 116 may be, but is not limited to, a speaker, an audio out, a video out, a remote control output, a printer, or any combination thereof.

Each of the components of the computer system 102 may be interconnected and communicate via a bus 118. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, or any other network commonly known and understood in the art. The network 122 is shown in FIG. 1 as a wireless network. However, those skilled in the art appreciate that the network 122 may also be a wired network.

The additional computer device 120 is shown in FIG. 1 as a personal computer. However, those skilled in the art appreciate that, in alternative embodiments of the present application, the device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

Figure 2:
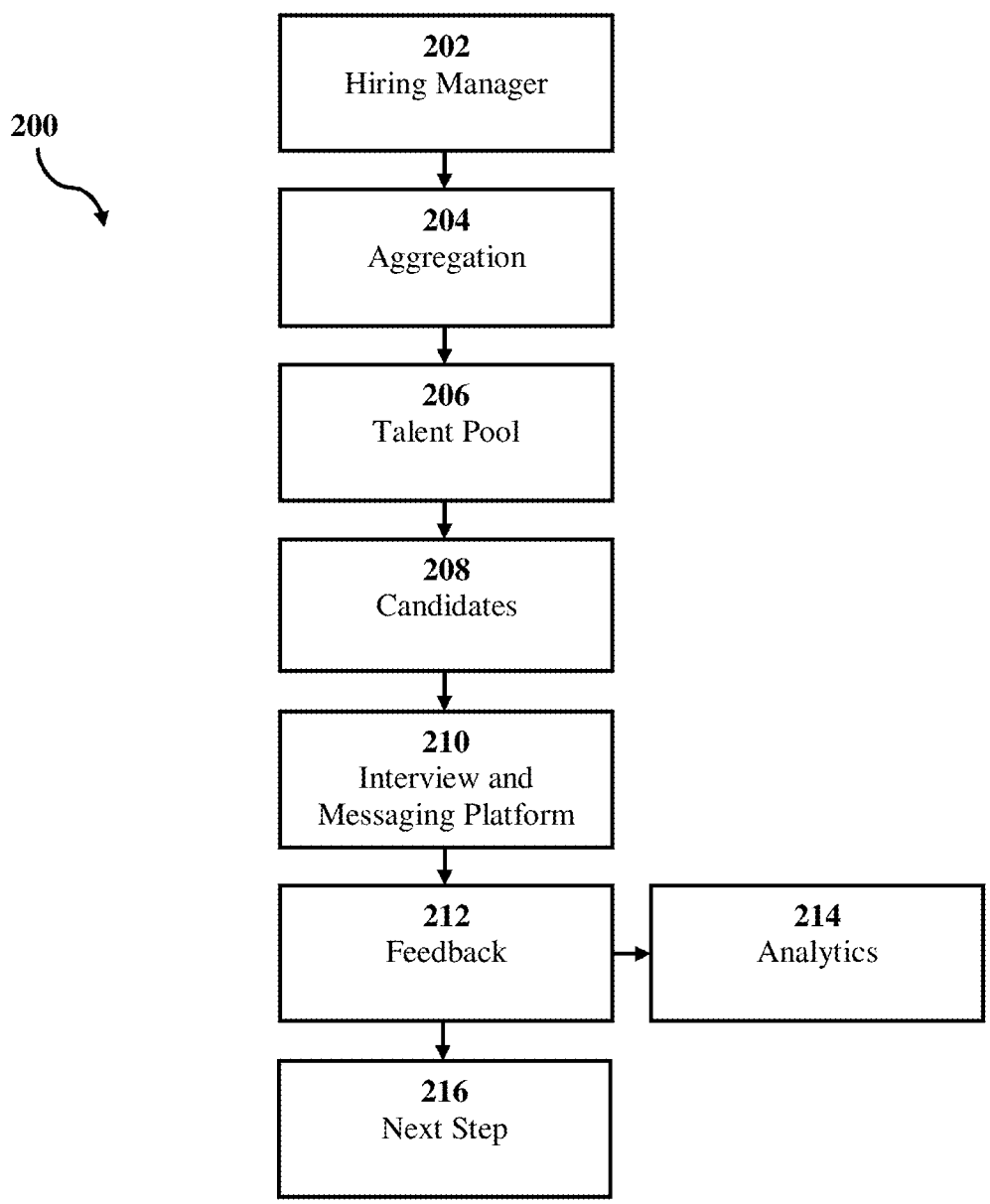
FIG. 2 illustrates an exemplary schematic of a workflow of a system for sourcing and recruiting candidates into an interview process.

An exemplary schematic of a workflow for sourcing and recruiting candidates into an interview process is generally shown at 200 in FIG. 2. The workflow may be implemented by various configurations of the server 102 as described with respect to FIG. 1.

The workflow 200 allows for a hiring manager 202 of an employer to access the computer system 102. As described above, the computer system 102 may be, for example, a server. The computer system 102 is referred to hereafter as server 102 for convenience.

While the term hiring manager 202 is generally described herein as accessing the server 102, it is to be known and understood that any additional or alternative employee, representative, or agent of the employer may access the server 102. In other words, the hiring manage 202 is interchangeable with the terms employer, employee, representative, agent, and other similar terms in additional embodiments of the workflow 200. Also, while the terms hiring manager, employer, employee, representative, and agent are used in singular form, it is to be known and understood that the terms may be interchangeably used in plural form.

The hiring manager 202 accesses the server 102 via one of the additional computer devices 120. The additional computer device 120 may be, for example, a mobile computing device. The hiring manager 202 may be required to complete a log-in process as generally known and understood in the art in order to access the server 102. The hiring manager 202 may also be required to complete a separate registration process in addition to the log-in process. The registration process may require a monetary or other fee. The fee may be for a specific time period or for a predetermined number of accesses to the server 102 or searches on the server 102. Of course, additional and alternative fees as known and understood in the art may be applied for the registration process or the log-in process. For example, the fee may be reduced or waived altogether for a specific time period or for a predetermined number of accesses or searches The hiring manger 202 may conduct a search for talent via the server 102. The search may be based on keyword input or one or more selections of job titles, criteria, and/or characteristics. The search may also be based on a geographic location and/or various other criteria as will be described herein. The geographic location may be determined based on user input or may be automatically determined. For example, the geographic location may be determined based on input of a zip code, identification of an Internet Protocol address, or identification of another identifier of the additional computer device 120 with which the hiring manager accesses the server 102. For example, the geographic location may be determined based on geolocation of the additional computer device 120 or by any other known and understood method or standard. The search may further include additional or alternative fields, such as but not limited to, minimum years of experience, industry, work experience, etc. A non-limiting and exemplary talent or job description is shown by FIG. 3. Of course, information listed in the talent or job descriptions shown by FIG. 3 are merely exemplary and not limiting or exhaustive. The talent or job description may additionally or alternatively include a statement or blurb relating to the role or position, a term or scope of the role or position, a role or impact, company or team size, breakdown of company or team size, reasons for hiring, top three must-haves, onsite or telecommuting availability, at home or abroad, new division vs. maintenance, etc. Again, these items are merely exemplary and are not limiting or exhaustive.

Upon receipt of search criteria from the hiring manger 202, the server 102 performs an aggregation 204 of big data from across a network to define a search area. The search area defines a talent pool 206, from which candidates 208 are identified. Accordingly, the server leverages and aggregates the big data to allow the hiring manager to directly target and recruit prospects instantly, leveraging verifiable and action-based aptitudes and skillsets. The aggregation 204 comprises a reverse job board ideology which turns traditional recruitment 180 degrees. Such a platform or ideology is defined as action versus reaction, or pro-active versus reactive. Said another way, the platform or ideology is 100% outbound, as compared with inbound. In contrast, traditional recruitment is 95% reactive. That is, in the current ecosystem, a job is often posted on the internet and made available to the public, with more jobs seemingly being sent to someone as a recommendation or suggested opportunity nowadays. An exemplary schematic of the current recruitment ecosystem is shown by FIG. 4.

Under the current recruitment ecosystem, anyone can apply for a posting indiscriminately. Unfortunately, recruiters or hiring managers do not have the training, ability, or bandwidth to be able to manually filter and select the appropriate candidates. That is, the recruiters or hiring managers simply do not have the time to perform manual filtering and selection efficiently and effectively, and to also arrange and conduct interviews, without making mistakes or creating a negative user experience. The embodiments of the server 102 described herein, however, allow the search criteria, upon which a position may be defined to actually have a mind of their own and target candidates that are appropriate. The embodiments do not target individuals that do not meet the requirements and are not appropriate. The resultant search is not available to the public.

The network of which the aggregation 204 is performed may comprise the World Wide Web, the internet, an intranet, a local area network, a wide area network, or any other network or web which is commonly known and understood in the art. For example, the network may be the network 122 as described with respect to FIG. 1.

The aggregation 204 of the network may be based on the search criteria. The aggregation 204 may also be based on the geographic location. For example, the areas of the network which are aggregated may be limited to being within the geographic location or within a predetermined distance of the geographic location. Additionally or alternatively, the areas of the network which are aggregated may have a sliding scale relationship with the geographic location. That is, the geographic location or distance therefrom may be expanded for higher quality areas. The opposite may also be true. That is, the geographic location or distance therefrom may be decreased for lower quality areas.

The network may be openly searched based on the search criteria input by the hiring manger 202 to define the areas which are to be aggregated. For example, the network may be searched via a search engine associated with the network. Additionally or alternatively, pre-defined areas or locations of the network may be searched. For example, specific top-level domains or hostnames may be searched. Specific uniform resource locators and websites may additionally or alternatively be searched. The areas or locations of the network which are aggregated may be specified by the hiring manger 202 or the server 102. The hiring manger 202 may input or select the areas or locations of the network to define the talent pool 206 from which to search. The talent pool 206 may comprise, for example, prospects for recruitment. In this regard, terms talent pool, prospects, candidates, candidate prospects, as well as other similar terms are used interchangeably herein. The server 102 may determine the areas or locations of the network in which to search based on the search criteria and/or the geographic location, or also based on preexisting relationships with the areas or locations.

For example, GitHub is source code repository. If the hiring manger 202 is searching for a Java developer, the hiring manger 202 may input or select GitHub as an area or location to define the talent pool 206 from which to search. Additionally or alternatively, the server 102 may determine or suggest GitHub as an area or location to define the talent pool 206. The server 102 may determine or suggest GitHub as an area or location based on conducting an open search on a search engine, or the server 102 may reference an internal database to determine the area or location. The database may be, for example, the memory 106 of FIG. 1. The database may be manually provided with areas or locations to define the talent pool 206, such as GitHub. Additionally or alternatively, the database may be self-updating or utilize machine learning. For example, as will be more apparent from the disclosure below, the server 102 may determine that a candidate 208 for a Java developer position, which is selected from among the talent pool 206, uses GitHub based on a profile of the candidate 208. If GitHub is a previously unknown or unidentified area or location for Java developers, when the candidate 208 is discovered or if the candidate 208 receives positive feedback from the hiring manager 202, the server 102 may associate GitHub as a valuable resource for Java developers and add the area or location to the database. In other words, the server 102 may use profile information of desirable candidates 208 to update and render the database current.

When the area or location of GitHub is newly discovered as a valuable resource, the server 102 may associate GitHub with a tag based on the search criteria of Java developer. The server 102 may also add the area or location of GitHub to the database with a priority score or a temporary label. The priority score or the temporary label may be increased or removed upon uncovering additional candidates 208 which identify GitHub in their profiles. Thus, the server 102 improves its learning capabilities by referencing the profiles of multiple candidates 208.

Of course, the above-examples are merely exemplary and are not meant to be exhaustive or limiting. For example, any additional areas or locations may be added to the database by searching profiles of registered users or members of the server 102. The areas or locations may be added to the database when a predetermined number of users or members list the areas or locations in their profiles, or when users or members of a sufficient level list the areas or locations in their profiles. Moreover, it is to be known and understood that the reference to GitHub above is merely exemplary and that additional or alternative areas may also be used to define the talent pool 206 and/or stored in the database. Also, while GitHub is generally referenced as a singular website, it is to be known and understood that plural websites and/or other locations may be used to define the talent pool 206 based on a single set of search criteria. FIG. 4 lists several additional exemplary websites and locations which include areas for defining the talent pool 206 which may be searched for candidates 208. The candidates 208 may refer to selected ones of the talent pool 206 or prospects. In other words, the candidates 208 are selected candidates.

The areas or locations of the network, which may be determined based on the search criteria and/or the geographic location, define the talent pool 206. The talent pool 206 within the areas or locations of the network is searched for candidates 208. For example, regarding the exemplary location of GitHub, the users of the website comprise the talent pool 206. The talent pool 206 may be further limited based on the search criteria and/or the geographic location. For example, the talent pool 206, or users or members of the areas of the network identified in the aggregation 204, may be further limited to being within the geographic location or within a predetermined distance of the geographic location. Additionally or alternatively, the talent pool 206 which is to be searched or returned may have a sliding scale relationship with the geographic location. That is, the geographic location or distance therefrom may be expanded for higher quality talent. The opposite may also be true. That is, the geographic location or distance therefrom may be decreased for a lower quality talent. In any event, the users may be limited or filtered based on the search criteria and/or the geographic location, or the entirety of the users or members of the website or areas of the network identified in the aggregation 204 may be evaluated as the talent pool 206. Exemplary embodiments and algorithms for searching the talent pool during the aggregation are described herein, such as with respect to FIGS. 26, 27, and 28.

The talent pool 206 is evaluated based on the contents of the areas or locations of the network. For example, the areas or locations of the network may be searched for publications, speaking engagements, questions posted, questions answered, code posted, ratings, achievements, abilities, or any other content which may be included within the areas or locations of the network. Again with respect to the code repository website of GitHub, the projects includes therein may comprise the contents which are searched. The searched content is associated with the users related thereto, such that the talent pool 206 consists of the users who are active or engaged on the areas or locations of the network, e.g., users who are active or engaged on GitHub. In this regard, "actions speak louder than words." That is, the users' actions within the areas or locations of the network are associated with the users to provide evaluations thereof. Accordingly, the talent pool 206 may comprise the users which are identified by the areas or locations of the network via their actions.

The users of the talent pool 206 may be identified by name or username. If the users are identified by username, the server 102 may conduct a search for the username on the areas or locations of the network, or on any additional networks described herein, in order to identify a name associated with the username. Additionally or alternatively, the server 102 may obtain a name associated with the username via cooperation of the area or location in which the username is included. The server 102 may maintain a database of names and associated usernames and/or aliases, from which it may also determine a name associated with a username. The database may be, for example, the memory 106 of FIG. 1. Of course, the examples described above are merely exemplary and are not limiting or exhaustive. The server 102 may determine names associated with usernames via any additional or alternative known methods. For example, the server 102 may search profiles of its users or members to match usernames with names. The names may comprise any combination of a first name, a middle name, a middle initial, a last name, a given name, a surname, a family name, or any other name commonly known and understood.

The users of the talent pool 206 may be evaluated, via the contents of the areas or locations of the network, based a single criteria or several criteria. The criteria may be predetermined by the server 102 or specified by the hiring manger 202. The hiring manager 202 may, for example, select criteria from amongst a plurality of predetermined criteria.

In an embodiment of the server 102, the criteria may include any combination of five pillars, including: (1) a self-score pillar; (2) a skill set pillar; (3) a community pillar; (4) a relationship pillar; and (5) an interview/review pillar. The criteria by which the users of the talent pool 206 are evaluated are generally referred to hereinafter as pillars for convenience.

Each pillar may be associated with a score, percentage, rank, classification, or other grade. The pillars are described hereinafter as being associated with a score for convenience. Nevertheless, the pillars are not to be interpreted as being associated with only a score and it is to be understood that the pillars may be associated with any of the above-mentioned evaluations or similar terms. Moreover, it is to be known and understood that a certain pillar may be associated with one evaluation, such as a score, while other pillars are associated with different evaluations, such as a percentage and a rank.

The score for each pillar may be determined based on aggregate or cumulative content of all searched areas or locations of the network. For example, each piece of content which corresponds to a relevant pillar may increase or otherwise affect the score of that pillar. Additionally or alternatively, the score may be determined based on an average or mean of the content of searched areas or locations of the network. For example, when the score is associated with a number of likes, the number of likes may be averaged over multiple postings. The average or mean may be determined for each searched area or location of the network individually, or the average or mean may be determined across all searched areas or locations of the network in total. That is, the server 102 may determine an average number of likes for posts on each of plural websites, or the server 102 may determine and average number of likes for posts across all of the websites. Of course, the above examples are merely exemplary and not limiting or exhaustive. For example, the scores may be determined based on a highest or lowest score of the content for each area or location individually, or for all areas or locations in total.

The server 102 may also filter pieces of content for a user. The server 102 may filter the pieces of content to improve accuracy and/or to prevent fraud or manipulation of the system. For example, the server 102 may filter pieces of content which include outlying scores. That is, if a user is associated with plural pieces of content which are highly regarded in a community and associated with one piece of content which is lowly regarded in the community, the server 102 may disregard the lowly piece of content as potentially being associated with a different user or as being an anomaly.

The server 102 may also filter pieces of content based on timestamps and/or locations of the pieces of content. For example, if a user is not associated with any piece of content for a first, e.g., longer, time period but is then associated with plural pieces of content during a second, e.g., shorter, time period, the server 102 may group the plural pieces of content and/or disregard some or all of the plural pieces of content. As a result, a user which is inactive within a community may not receive a high score for participating in a single, active debate or other discussion. Such an embodiment would also prevent a user from manipulating his or her score, such as when the user becomes unemployed.

As an additional example, the server 102 may identify geotags or metadata associated with plural pieces of content to determine whether the plural pieces of content are likely associated with a same user. If the geotags or metadata indicate that plural pieces of content are from one location while one piece of content is from another distant location, the server 102 may disregard the one piece of content. However, if all of the pieces of content are from different locations, the server 102 may determine that the user is a frequent traveler and/or uses different proxy servers. As a result, the server 102 may maintain the pieces of content. Even further, if the server 102 determines that pieces of content of a user are anonymized, the server 102 may disregard the content and/or the user as being untrustworthy. That is, the server 102 may exclude the user from the candidates 208.

Even further to the above, in embodiments of the present application, the system may consistently, intermittently, or constantly tweak or modify the method, manner, or algorithm upon which the scores are determined. In such an embodiment, users would be further prevented from manipulating the server 102.

With respect to the self-score pillar mentioned above, just as the hiring manager may log-in to and/or register with the server 102, individuals who may be interested in potential employment or recruitment may complete a log-in process and/or registration process with the server 102. The log-in process and/or registration process of the individual may be similar to the processes described above or as generally known and understood in the art. In this regard, the individual may complete a member profile. The member profile may include, among others, a name, any usernames, any aliases, personal information, education information, and employment information. The individual may even be permitted to upload a resume and/or to list websites, areas, or locations of interest. The server 102 may use the member profile to associate a username with the individual, as described above. The server 102 may also use the member profile to automatically update the database of locations or areas, also as discussed above.

Figure 5:
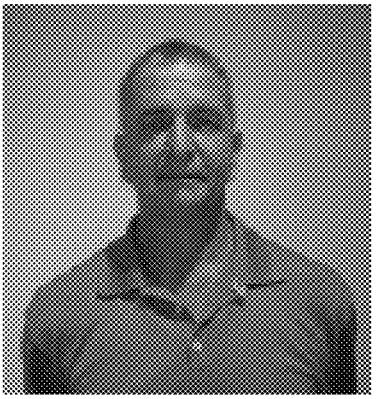
FIG. 5 shows an exemplary embodiment of a user profile for a system for sourcing and recruiting candidates into an interview process.

A non-limiting and exemplary embodiment of a member profile is shown by FIG. 5. In embodiments of the server 102, a top portion of the member profile of FIG. 5 may comprise a business-to-consumer (B2C) portion. The top portion may also comprise be available via mobile interface only, whereupon all members will download a mobile application and be able to configure the profile via a mobile device. The mobile application may be available across any platforms including, but not limited to, Android, iOS, and Responsive Design. Of course, the above-described and shown profiles are merely exemplary and may include any additional or alternative information or features as known and understood in the art. In any event, the member profile may be used to provide the self-score pillar evaluation. The self-score pillar evaluation, however, is generally indicative of words and not actions. That is, the individual generally provides the information upon which the self-score pillar evaluation is based. As a result, this pillar may be more susceptible to manipulation and deceit, and thus, may be regarded less highly than the other pillars.

The skill set pillar may be based on pieces of content from the areas or locations of the network which relate to rankings within the areas or locations, or popularity within the areas or locations. For example, the skill set pillar may be based on a code proficiency ranking, a number of questions answered by a user, likes or dislikes for comments provided by the user from other users of the areas or locations of the network. Of course, these examples are merely exemplary and are not limiting or exhaustive.

The community pillar may be based on pieces of content from the areas or locations of the network which relate to questions answered by a user, a quantity of information contributed to the areas or locations of the network, publications made available to the areas or locations of the network, presentations made on or referenced as being made by the areas or locations of the network, presentations attended on or referenced as being attended by the areas or locations of the network, meet-ups attended on or referenced as being attended by the areas or locations of the network, etc. In other words, the community pillar is a reflection of how active a user is in the community or in the areas or locations of the network. For example, with respect to the above-mentioned website of GitHub, the community pillar may include a number or quantity of code contributed as well as possibly a level of use of the contributed code amongst the community and/or an evaluation of the code by the community. In this regard, in an alternative embodiment of the present application, the level of use of the contributed code amongst the community and/or the evaluation of the code by the community may be under the skill set pillar as they may be indicative of a level of skill of the user. In any event, as should be clear from the above, embodiments of the present application may include overlap of classification of the pieces of content. The pieces of content may even be applied to plural pillars. Nevertheless, it should again be understood that the above-described examples are merely exemplary and not limiting or exhaustive.

The relationship pillar may include the existence of any relationship between the hiring manager and/or the employer for which the hiring manager is engaged in a hiring process and a user of the talent pool 206. When entering the search criteria or completing a member profile, the hiring manger may identify the employer, any information related to the employer, any employees of the employer, and/or any information related to the employees of the employer. The server 102 may then search the areas or locations of the network to determine whether any users in the talent pool 206 have a preexisting or other relationship with the employer, employees, or other information. For example, the server 102 may determine whether a user of the talent pool 206 has previously worked at a same place of employment as an employee of the employer. The server 102 may additionally or alternatively determine whether a user of the talent pool 206 previously attended a same school as an employee of the employer. The server 102 may even search social networking websites, applications, or platforms to determine whether any social connection exists between a user of the talent pool 206 and an employee of the employer. Such identification under the relationship pillar may allow for easier vetting of a user of the talent pool 206. As a result, the server 102 may label a user of the talent pool 206 as a candidate 208 when the user has a high relationship score, even when scores of the other pillars may be lacking or substandard.

The interview/review pillar may comprise reviews of interviews previously conducted with users of the talent pool 206. That is, as will be discussed below, qualified users of the talent pool 206 may be identified as candidates 208. The candidates 208 may be afforded opportunities to communicate, and even interview, with the hiring manager 202. The hiring manager 202 may then provide feedback or reviews of the candidates 208. In embodiments of the present application, such feedback and reviews provided by the hiring manager 202 may only be available to other hiring managers 202. As a result, the interview/review pillar may provide internal, uninfluenced scores of users of the talent pool 206.

A same set of areas or locations of the network may be searched for all of the above-mentioned pillars, or different areas or locations of the network may be searched for different pillars. For example, social networking websites may be searched for the relationship pillar but not the skill set pillar. Instead, code repository websites may be searched for the skill set pillar, but not for the relationship pillar. The server 102 may have non-existent, pre-existing, or independent relationships with the areas or locations of the network which are searched. In this regard, since users may receive employment and recruitment opportunities by visiting and participating at the areas or locations of the network, the areas or locations of the network may be incentivized to establish a relationship with the server 102. Along these lines, the server 102 may utilize application programming interfaces (APIs) of the areas or locations of the network to facilitate searching of the areas or locations for the pieces of content. The APIs may public, or bargained for via the incentive to establish the relationship with the server 102.

After reviewing and evaluating the talent pool 206 defined by the areas or locations of the network, candidates 208 are identified from among the talent pool 206 for presentation to the hiring manager 202. In embodiments of the present application, a predetermined number of candidates 208 may be presented to the hiring manager 202, highest scoring users of the talent pool 206 over all pillars may be presented to the hiring manager 202 as the candidates 208, highest scoring users of the talent pool 206 from each pillar may be presented to the hiring manager 202 as the candidates 208, or the candidates 208 may be determined in accordance with any other known and understood criteria. The candidates 208 may be selected based on criteria set by the system, or the candidates 208 may be selected based on criteria set by the hiring manager 202. In certain embodiments, a membership level of the hiring manager 202 may affect the ability to set the criteria upon which selection of the candidates 208 is based or a number of the candidates 208 which may be presented. In any event, candidates 208 are selected from amongst the talent pool 206 and presented to the hiring manager 202 based on the searching of the areas or locations of the network and the evaluations of the pillars.

Figure 6:
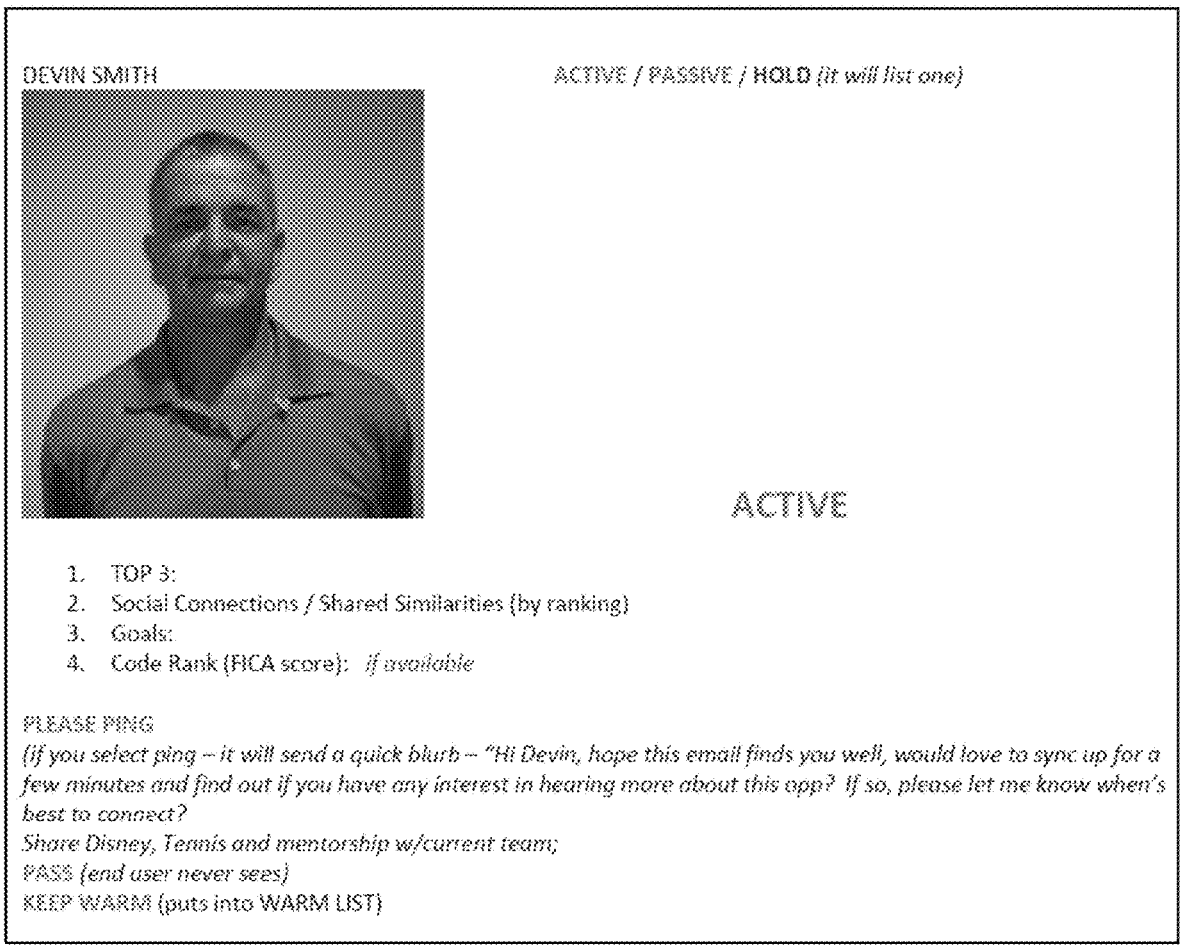
FIG. 6 shows an exemplary embodiment of a candidate profile for a system for sourcing and recruiting candidates into an interview process.
Figure 11:
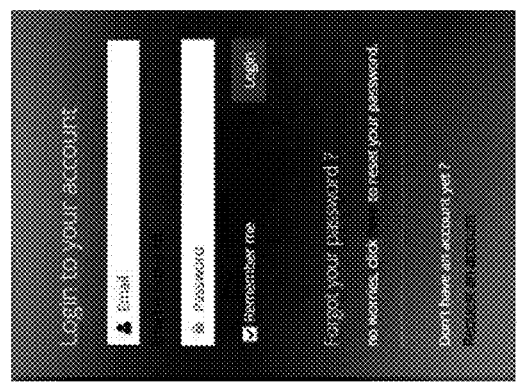
FIGS. 11, 12, 13, 14, 15, 16, 17, 18, 19, 20, 21, 22, and 23 show various display screens of an executable program, recording on a computer-readable recording medium, for sourcing and recruiting candidates into an interview process.
Figure 12:
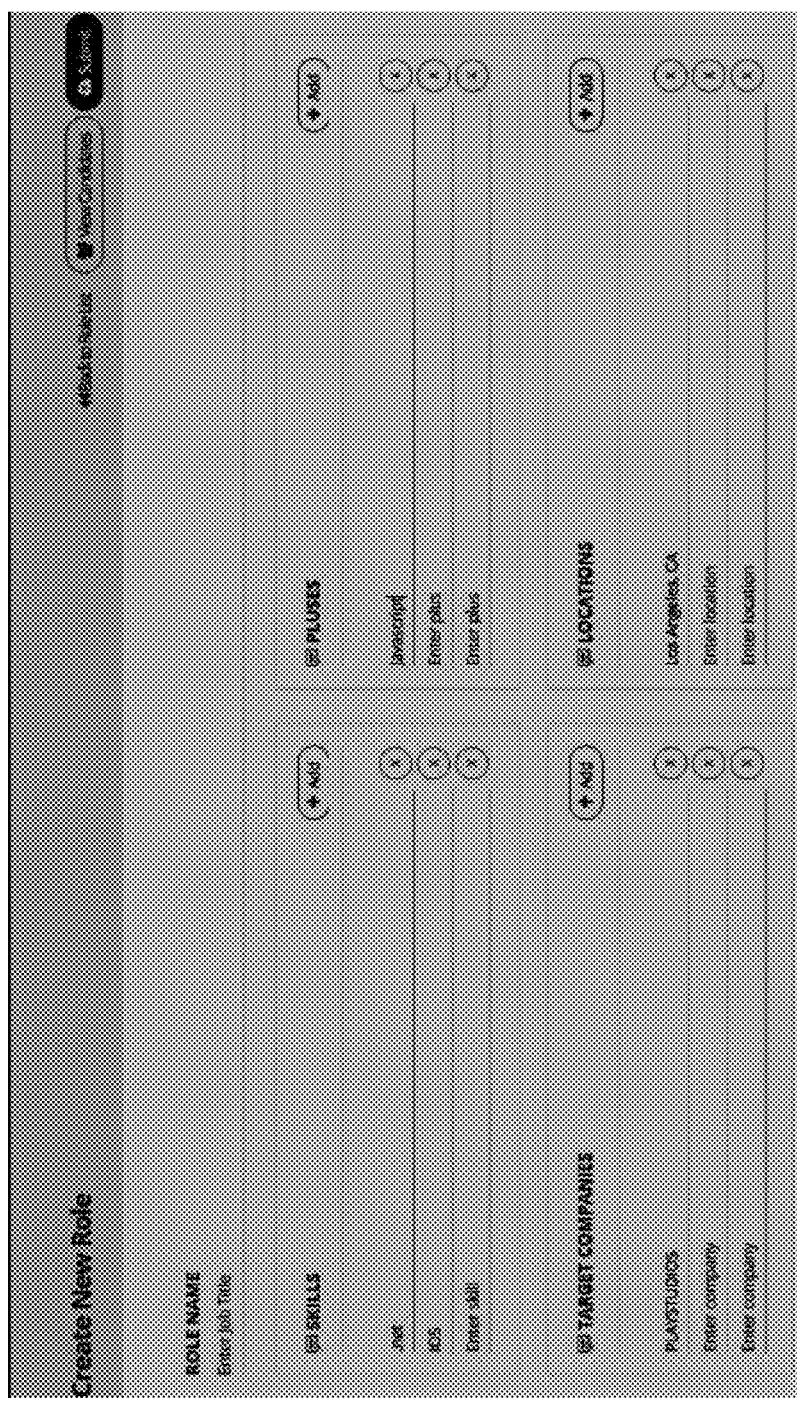
Figure 13:
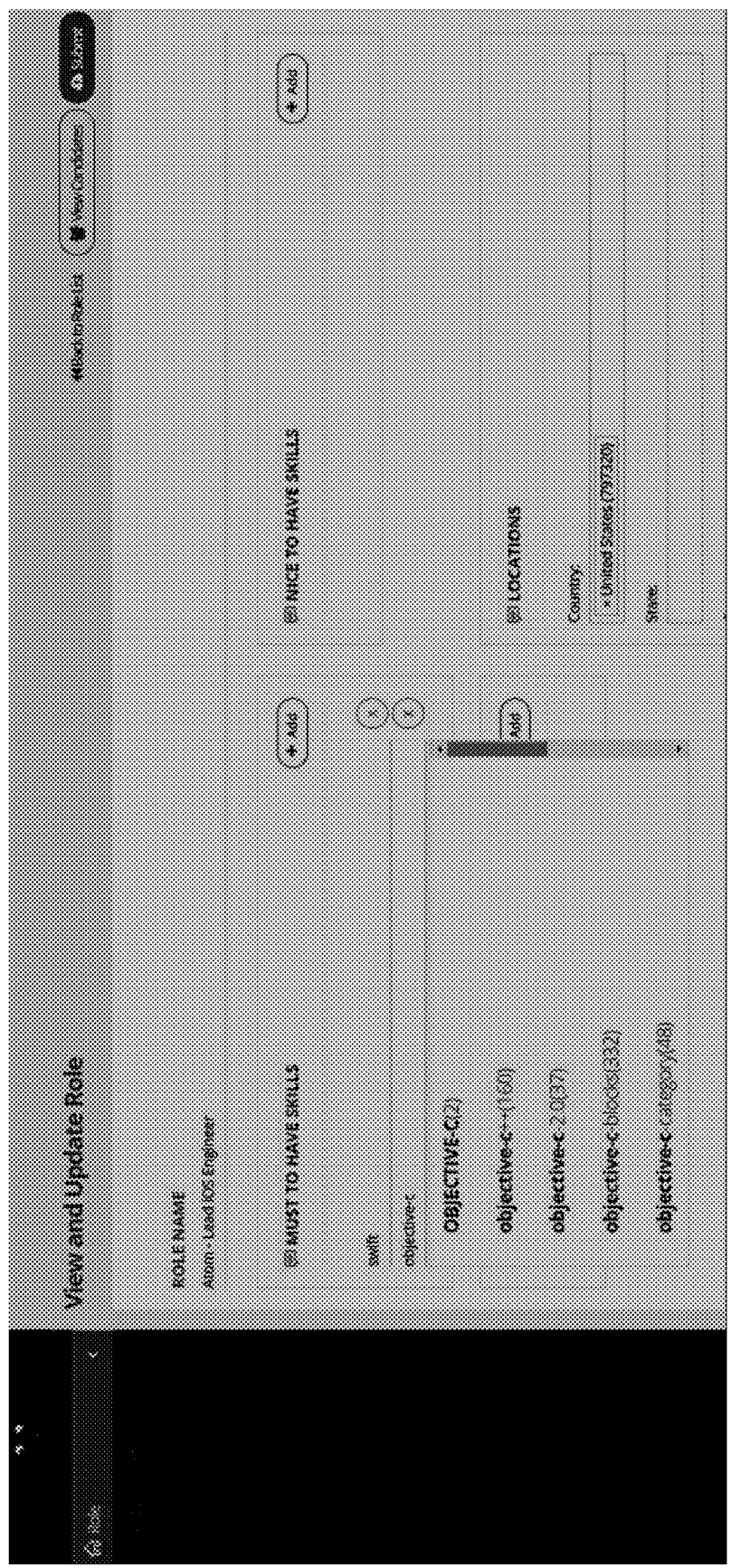
Figure 14:
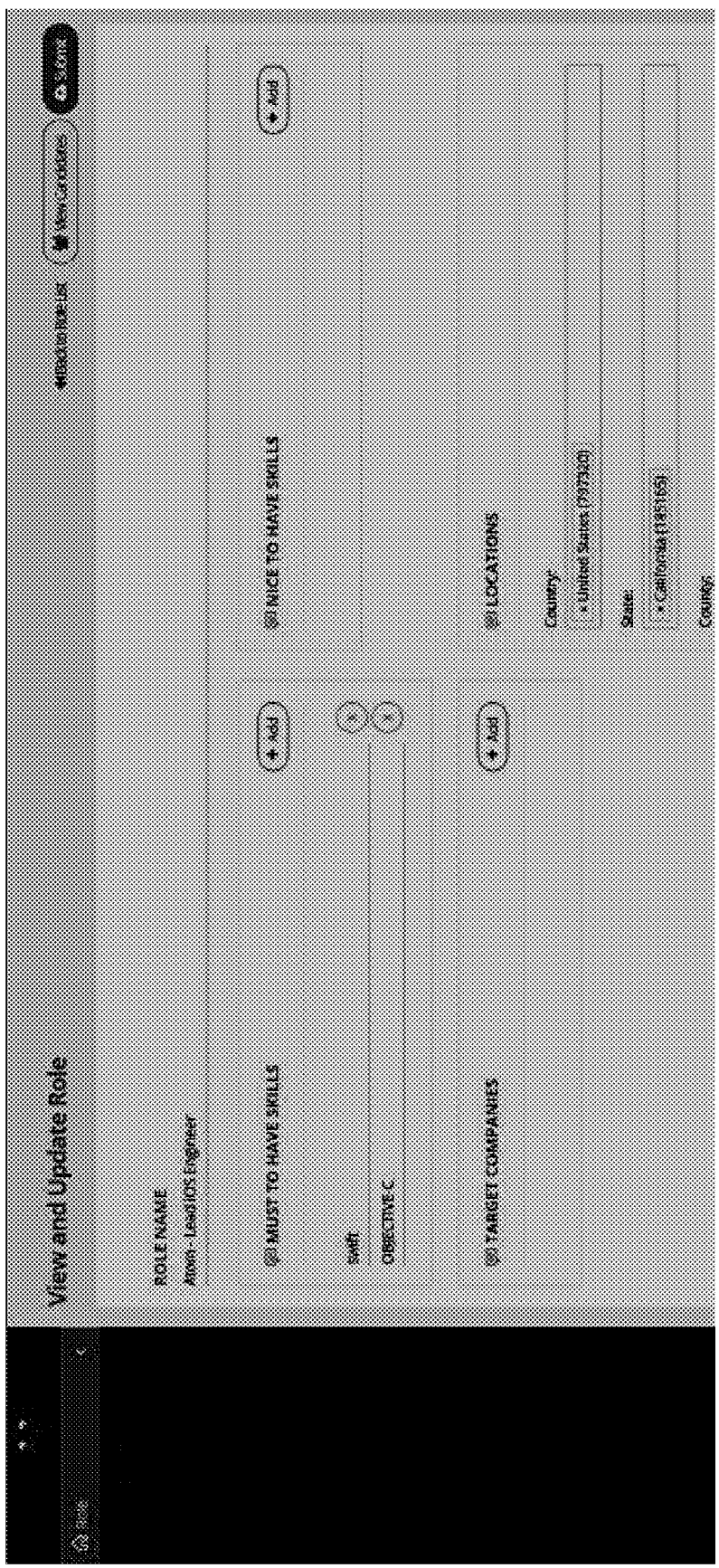
Figure 15:
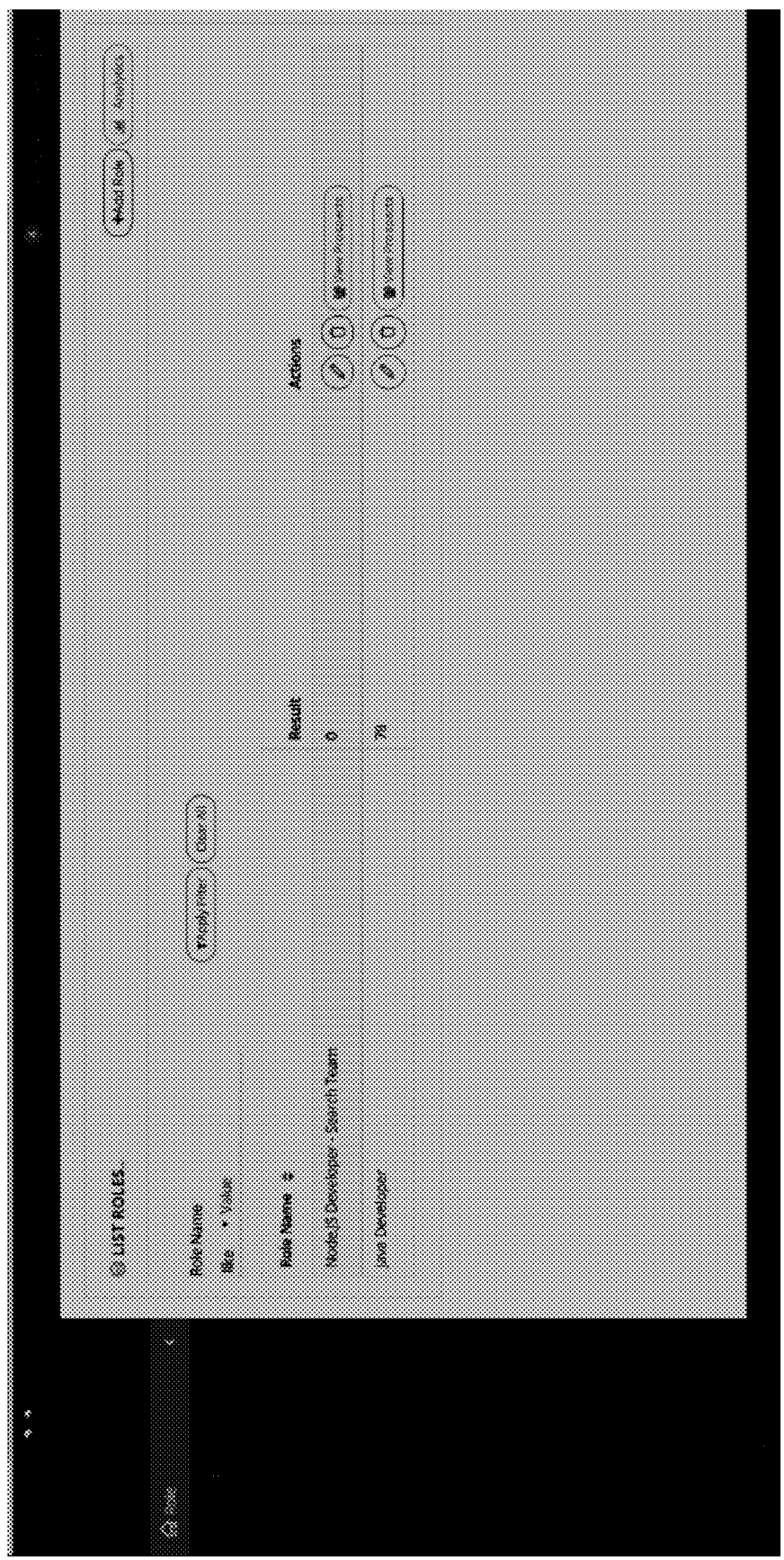
Figure 16:
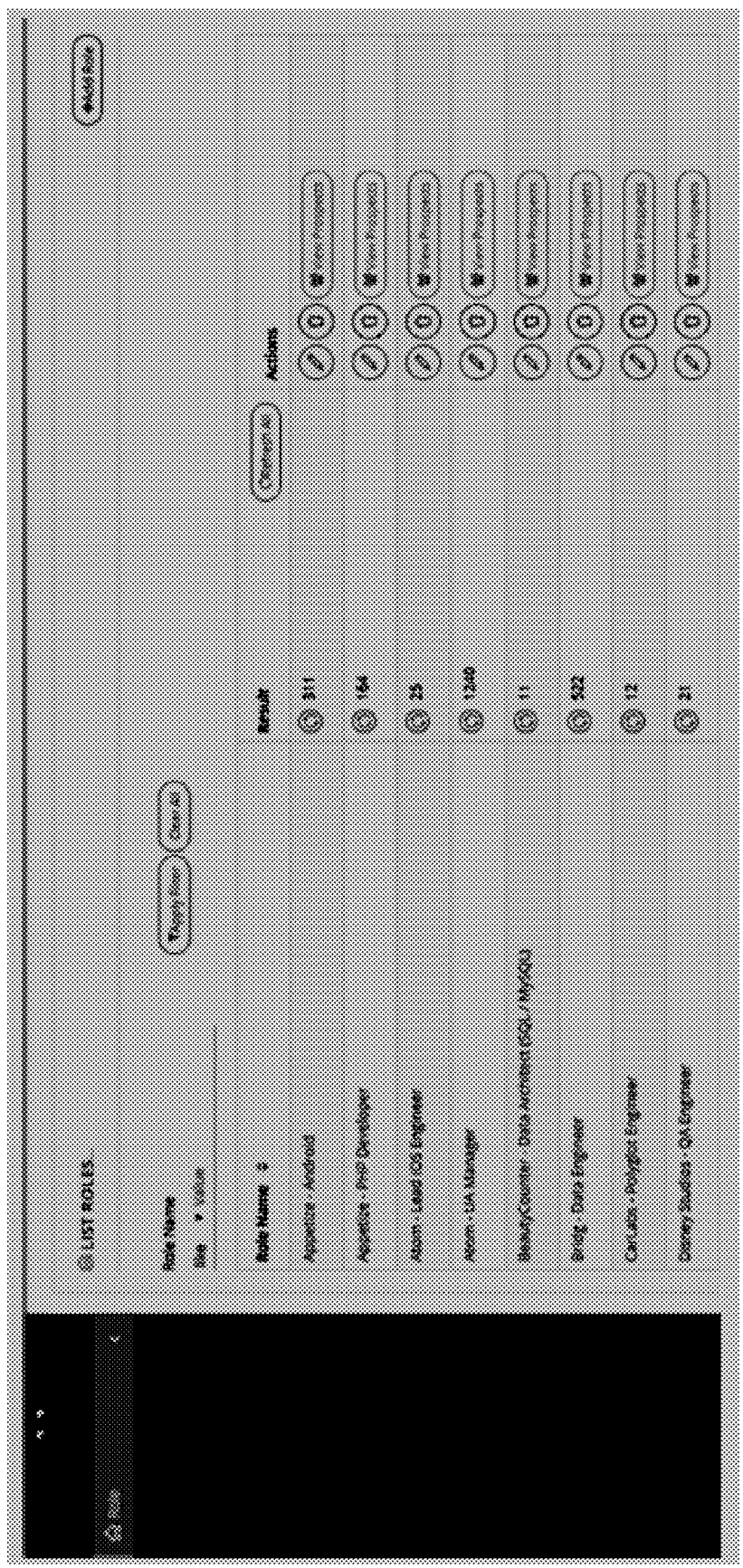
Figure 17:
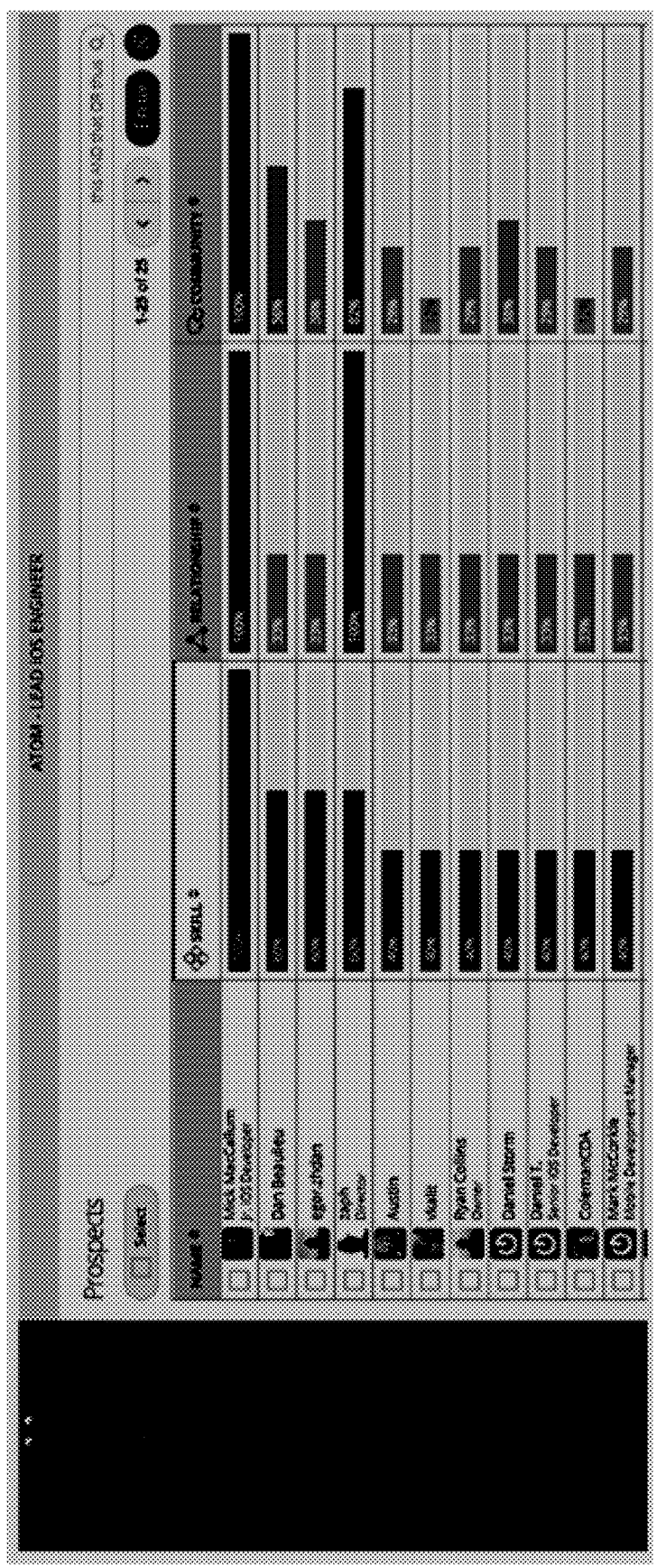
Figure 18:
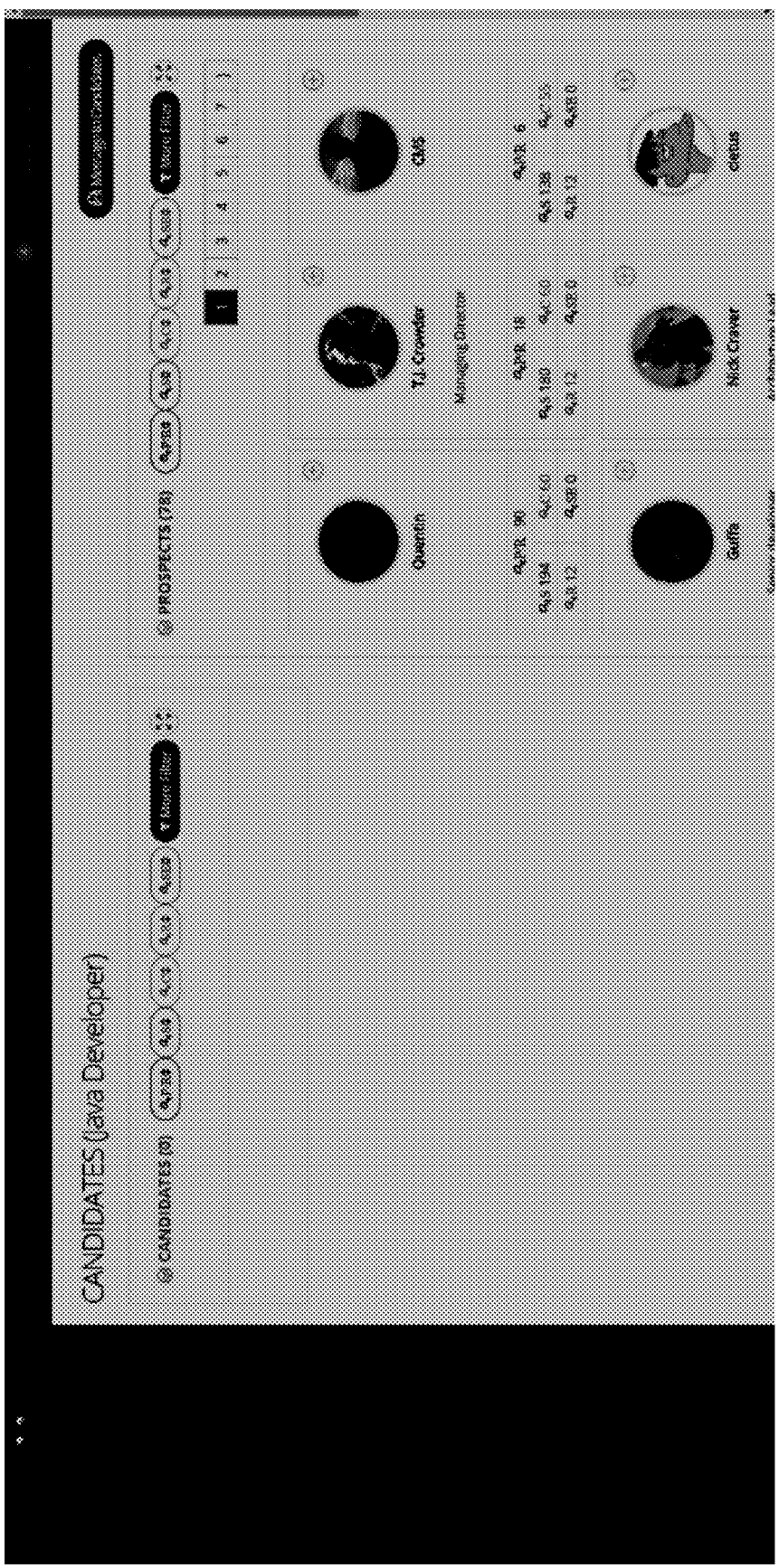
Figure 19:
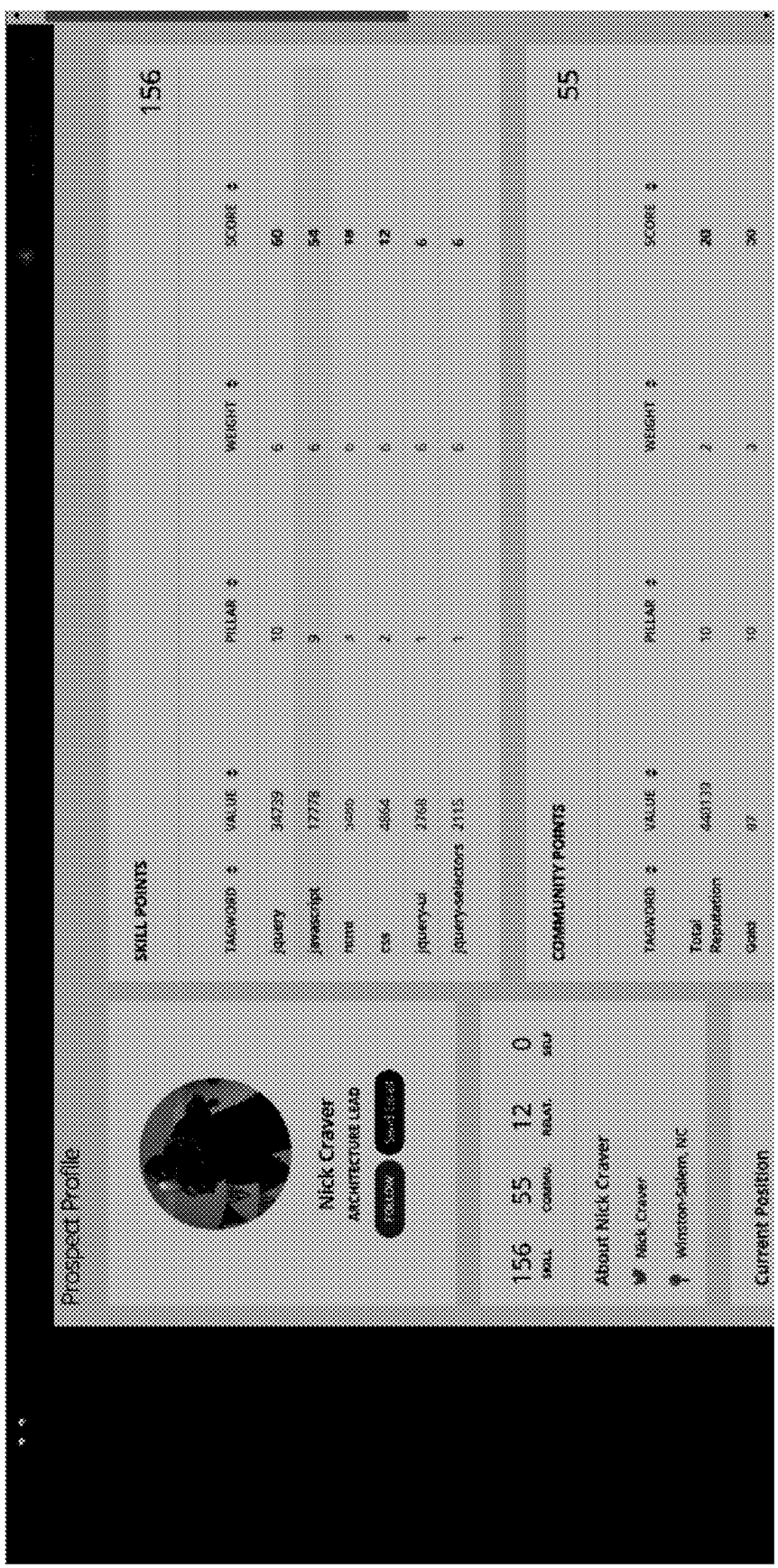
Figure 20:
Figure 21:
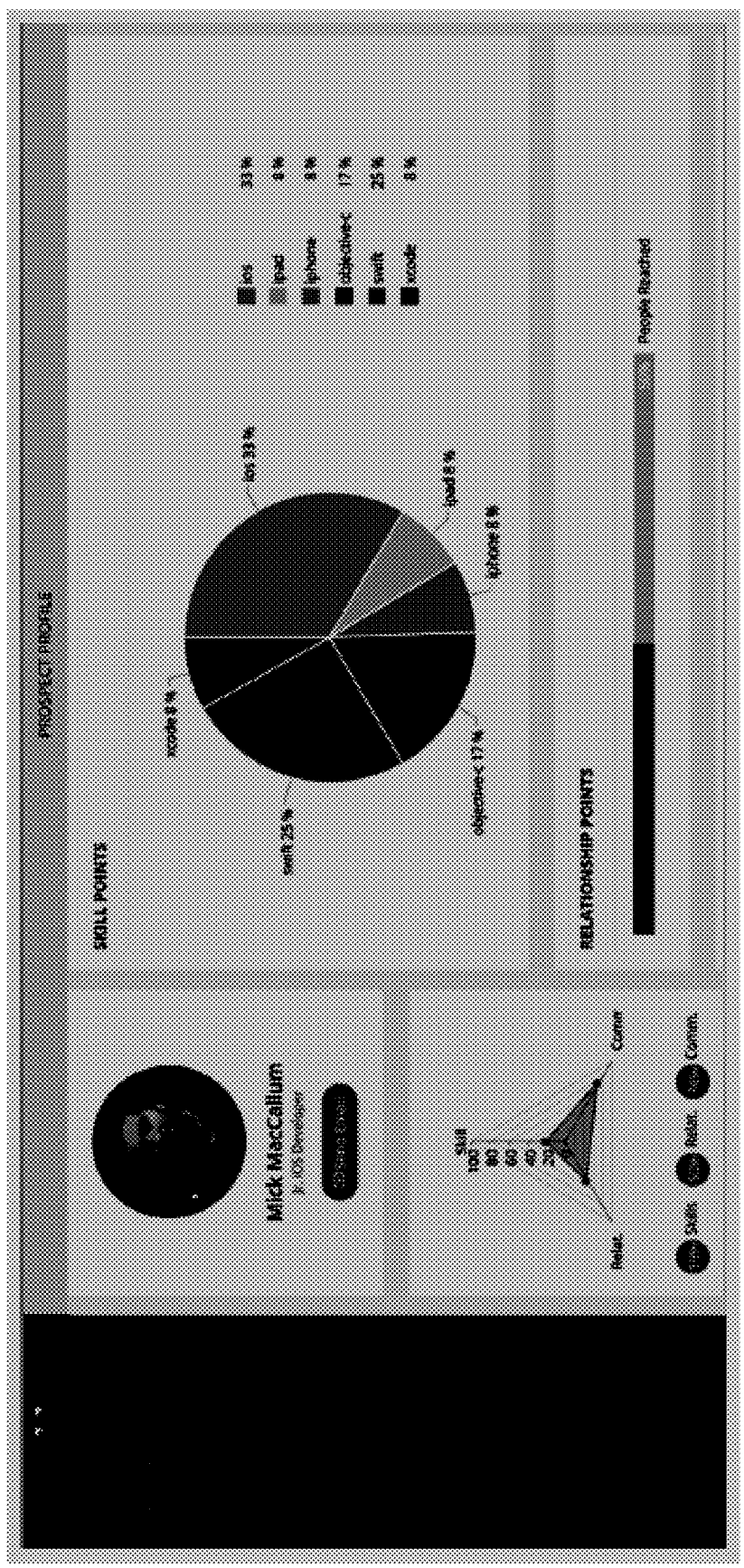

Non-limiting and exemplary embodiments of candidate profiles of candidates 208 are shown by FIG. 6 and FIG. 7. As shown in FIG. 6, a candidate profile may include an indication of whether a candidate 208 is in an active, passive, or hold state. When the candidate 208 is a member of the system, the member may set his or her profile to one of the active, passive, or hold states. When the member is in the active state, the member is actively looking for employment or recruitment opportunities. When the member is in the passive state, the member is passively looking for employment or recruitment opportunities. That is, while the member is not looking for employment, the member may be interested in hearing about opportunities. When the member is in the hold state, the member is holding steady with his current position and is not interested in employment or recruitment opportunities. In the hold state, the member may even be made private. That is, the member's information may be excluded from the candidates 208. Such state information which may be set by the member avoids unnecessary expenditure of resources by the hiring manager 202 and the candidate 208.

Also as shown in FIG. 6, the hiring manager 202 has an option to ping, pass, or keep warm with respect to a candidate 208. When the hiring manager 202 elects to ping the candidate 208, a message is sent to the candidate 208. The message may be predetermined by the server 102 or the hiring manager 202. Additionally or alternatively, the message may be customizable by the hiring manager 202. The message may comprise a voice message, electronic mail message, text message, or any other message commonly known and understood in the art. In embodiments of the server 102, all communication may be done through agnostic messaging platforms such as, but not limited to, Twitter, Kik, Facebook, Direct Text Messaging, or any other mobile application. In such embodiments, as described above, location may be tracked via geolocation technology in lieu of zip codes or stated city and state. As a result, the above-functions allow the server 102 to forego emails and input geographic information, thereby gaining more accurate data in real-time, to bring maximum value to all involved parties.

In embodiments of the server 102, when the hiring manager 202 elects to ping the candidate 208, a drip frequency or tickle feature may be automatically enabled by the system or manually selected or enabled by the hiring manager 202. Under the drip frequency or tickle feature, the server 102 may be set to automatically re-ping the candidate 208 when a reply is not received from the candidate 208 within a predetermined period of time. A frequency of the automatic re-ping may be set by the server 102 or the hiring manager 202. The frequency may be constant or variable. For example, the frequency may decrease overtime, such that the automatic re-pings are eventually no longer sent. The drip frequency or tickle feature may additionally or alternatively be set to expire after a predetermined number of automatic re-pings.

When the hiring manager 202 elects to pass on the candidate 208, the candidate 208 may be removed from a candidate list. The candidate 208 may be discarded entirely, or the candidate 208 may be moved to an alternative location. In embodiments of the server 102, when the hiring manager 202 elects to pass on the candidate 208, the candidate 208 may be prohibited from being a candidate 208 of further searches, or the candidate 208 may be flagged as having been previously passed on. When the hiring manager 202 elects to keep the candidate 208 warm, the candidate 208 is moved to a warm list. The candidate 208 may remain in the warm list for a predetermined period of time or until the candidate is deleted by the hiring manager 202.

FIG. 7 shows a further embodiment of a candidate profile of the candidate 208. In this regard, as shown in FIG. 7, the candidate profile may include an option whereupon the hiring manager 202 may customize an order of a candidate list. The candidate profile may also include a candidate status indication and a candidate verification indication. The candidate status indication may indicate whether a candidate's profile is set to, for example, active, passive, or off-the-grid. As will be described herein, the candidate status may determine a level of accessibility to the candidate's profile. The candidate verification indication may indicate whether any, for example, education and/or certifications have been verified. The verifications may be dependent upon the candidate submitting or otherwise providing any necessary documentation, and/or the verifications may by established independently by the server 102. It should be known and understood that the candidate profile is not limited to the fields of information shown on FIG. 7. The candidate profile may additionally or alternatively include any job credentials, employment history, companies employed by, salaries, achievements, or any other fields of information known and understood.

Figure 22:
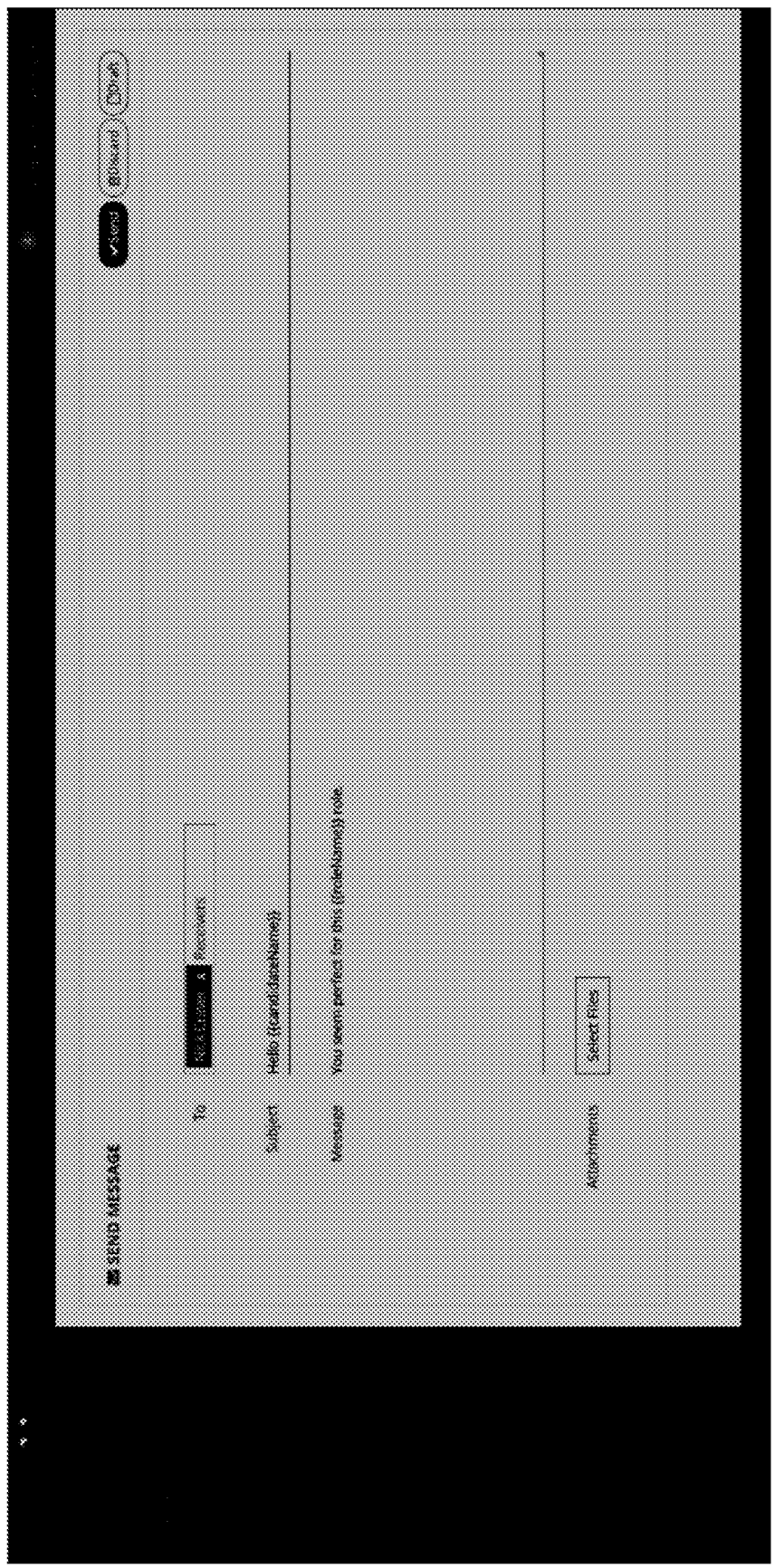
Figure 23:
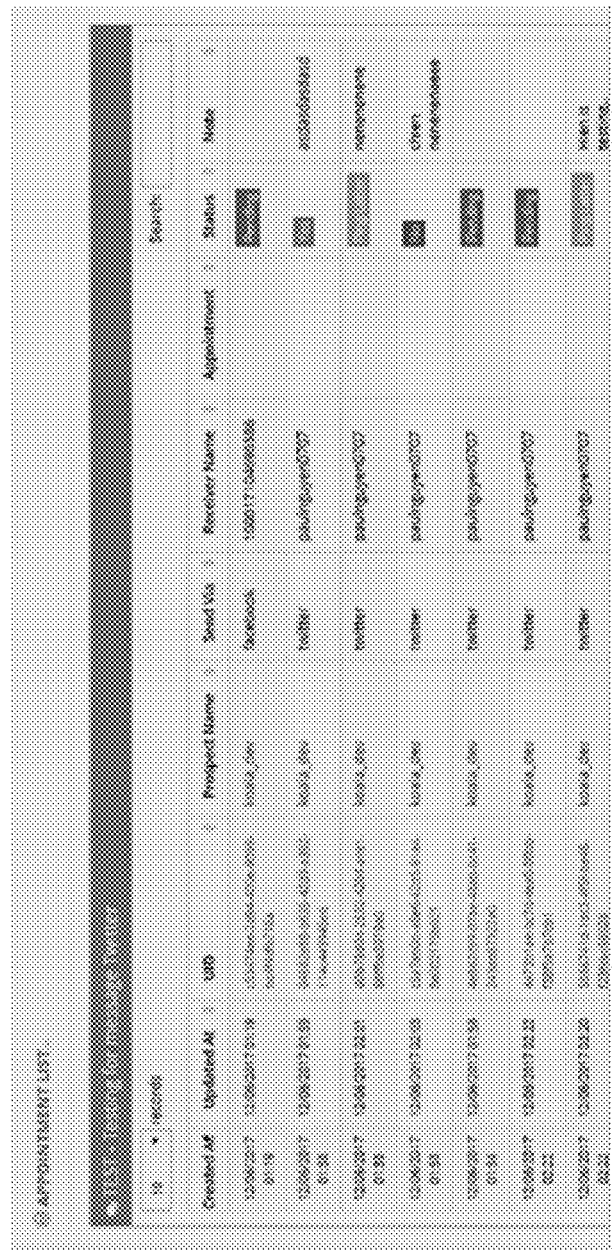

When the hiring manager and one of the candidates 208 express mutual interest, such as when the hiring manager 202 pings the candidate 208 and the candidate 208 replies, the server 102 facilitates establishing an interview between the hiring manager 202 and the candidate 208 via an interview and messaging platform 210 as shown, for example, by FIG. 22. The interview may further be established and monitored via a status dashboard, as shown, for example, by FIG. 23. The server 102 may automatically arrange the interview at a date and time based on calendar information of the hiring manager 202 and the candidate 208. The interview may be arranged as a phone interview, a video interview, an in-person interview, or any additional interview known and understood in the art. When the interview is automatically arranged, personal information of the hiring manager 202 and/or the candidate 208 may be protected. In addition, when such an interview is automatically arranged, the server 102 may negatively affect either of the hiring manager 202 or the candidate 208 which does not show for the interview. For example, when the candidate 208 does not show for the interview, the server 102 may affect the score of interview/review pillar of the candidate 208. Additionally or alternatively, the hiring manager 202 may negatively affect the score of the interview/review pillar of the candidate 208 by leaving a negative review for the candidate 208. When the hiring manager 202 does not show for the interview, the server 102 may fine or otherwise affect a membership status of the hiring manager 202.

In further embodiments, the server 102 may facilitate establishing the interview by providing or offering a benefit to the candidate 208. The benefit may be provided from the server 102 or from the hiring manager 202. The benefit may comprise a monetary or other benefit, and may be set by the server 102 based on member information of the candidate 208 or set by the hiring manager 202 based on a desirability of the candidate. Since the server 102 generally provides reverse recruitment process in which the hiring manager 202 targets the candidate 208, the hiring manager 202 has the ability to entice the candidate 208 to attend the interview 210.

The candidate profile as shown by FIG. 7 may further include an interview economy concept in which candidates 208 may be allowed to name a price that companies will have to pay to be able to communicate and set up an interview. Such a price would be similar to an access fee for the candidates 208 time and effort. The interview economy concept may be optionally engaged by the candidates. For example, not all candidates 208 would elect to put a price tag on themselves, but some of the more senior level and harder to gain access to skilled professionals may want to put a price tag. Such a price tag would show that the candidates 208 are disciplined and will not jump into an interview process, unless the company is serious. The server 102 may receive a percentage of the price tag, or any additional compensation as generally known and understood in the art such as, but not limited to, a fixed transaction fee.

In any event, upon completion of the interview 210, at least the hiring manager 202 is given the opportunity to provide feedback 212 for the candidate 208, such that the score of the interview/review pillar of the candidate 208 may be updated. The feedback 212 may be a feedback loop which is optionally provided to both or either of the candidate 208 and the server 102.

Upon receipt of the feedback 212, embodiments of the server 102 may perform analytics 214 of the feedback 212, the interview and messaging platform 210, and selection process of the candidates 208. The analytics 214 may relate to improving the functioning of the server 102. For example, data or scores of the pillars of the candidates 208 may be collected and analyzed to improve the functioning of any algorithms or processes upon which the talent pool 204 is searched. In other words, the analytics 214 may be used to make the algorithms or processes smarter. In this regard, the analytics 214 may additionally or alternatively incorporate the interview and messaging platform 210 and feedback 212 received by the server 102. The feedback 212 may include information from the hiring manager 202 and/or the candidate 208 which attends the interview 210. For example, the algorithms or processes may be updated each time the hiring manager 202 runs a new search or executes the interview and messaging platform 210. The hiring manager 202 may also update his or her profile, or a company profile, for each search. Such a feature would account for constant changes in team dynamics, hiring needs, and any additional requirements.

The analytics 214 may additionally or alternatively relate to a career progression of the candidates 208. That is, if the server 102 has the candidates 208 self-titles through their careers and their years of employment, the server 102 can determine progression as normal versus most. The server may determine the progression as being slow, mediocre, ambitious, complacent to some degree, etc. The analytics 214 may further determine flight risk versus stable risk, medium hiring risk, etc. in view of the career progression.

The analytics 214 may additionally or alternatively quantify based on title, e.g., if the candidates 208 are really VP level or senior level. The analytics 214 may further quantify based on principal, e.g., how hands-on/hands-off the candidates may be. For example, if a one-man shop labels himself as chief technology officer (CTO), but the rest of his credits are developer or systems engineer and they either overlap in years or supplement most of the career, then the server 102 can correlate the candidate has self-titled CTO, but in reality that the self-title is not quantifiable data. As an additional example, some candidates 208 list chief executive officer (CEO) or founder, but the company size is 1-10, or even 1. As a result, the server 102 could reclassify the candidates 208 as principal/individual proprietor versus running a legitimate company or leading a team of more than 2 people. Of course, the above-examples are merely exemplary and are not limiting or exhaustive.

As a derivative of the analytics 214, the server 102 may share such data with companies. For example, the server 102 may share the average amount of time a candidate 208 works for that specific company, or the types of companies that the specific candidate 208 has worked for, or seems to gravitate towards. Such information may be helpful in recruitment targeting, as well as employment brand marketing, advertising, etc.

The analytics 214 may even further tie in salary comparables and can correlate where companies fit in certain competitive pay buckets, which could validate quality of engineering team, or caliber of technology shop reputation. Such information may provide valuable graphs and metrics which may be shown in creative visualizations.

The analytics 214 may be derived by aggregating any combinations of the above-mentioned data and insight, using data science to forecast and come up with predictive analytics for individual candidates and companies within the server 102 or platform. The server 102 or platform may integrate machine learning into any processes or algorithms, which will become smarter on every search, every time.

Upon entry of the feedback 212, the hiring manager 202 and the candidate 208 proceed to the next step 216. The next step 216 may include the exchange of personal information, which may be facilitated by the server 102. Additionally or alternatively, the hiring manager 202 or the candidate 208 may receive personal information of the other via the corresponding member profile information. In this regard, in an embodiment of the server 102, the member profile information of the hiring manager 202 may be private, whereupon the member profile information becomes accessible to the candidate 208 when the hiring manager 202 leaves positive feedback 212 for the candidate 208.

Accordingly, the above-described workflow, examples, and embodiments provide a backwards recruitment process in which employers target the right candidates. The workflow and user interface are simple, the system is easily accessible to human resource departments, recruiters, and hiring managers. The system is also web and mobile friendly. Instead of a person applying for job on a traditional job board, the job generally applies for the person, directly from the company or hiring manager. In other words, the system comprises a reverse job board, mechanically speaking. The system localizes recruitment down to the hiring manager, team, and specific role. The system provides no haggling, targets the right candidates for the role and the team, is based on role requirements and social networking including ranking and/or scoring factors, covers the entire web, is not limited to a single site only, includes ease of use a simplistic user interface, allows for multiple bots at once, provides full control, provides interdepartmental transparency, and provides multiple-user access. Wouldn't candidates rather be sought after by the company or the hiring manager?

The above-described workflow, examples, and embodiments enable business-to-consumer activity. That is, an end user can create a profile and have an updated resume, add any social media profiles—social & professional, list references and past colleagues, list notable projects and major accomplishments, identify hobbies, provide a current geographic location, include code samples, provide a portfolio and tech stack, identify career interests and company types, provide an email address, and provide a current salary/hourly range. The profile may be mobile accessible and set to active, passive, or off-the-grid. As a result, nobody can access it, not even vendors or recruiters. The profile will only be accessed if the end user is right for the role, and shared based on the end user's status. The network is closed, and the end user can add geography, tech stack, company size, basic info on what is wanted. The end user will never be pinged unless role aligns, and the end user has the ability to opt out.

The above-described workflow, examples, and embodiments also enable business-to-business activity. That is, interaction is provided between the server and the hiring manager or employer. The interaction allows for a simple job description, such as the top three skills or responsibilities. The hiring managers and team members are allowed connections across all web channels. Searches may be geography specific to find someone in a specific area or radius. A company blurb may be provided to identify selling points, such as team/hiring manager, background/specific projects, or deliverables. The hiring manager or employer may provide salary info, bonus, and equity if applicable. The hiring manager also includes behind the scenes access, including customizable logins depending on hiring workflows. The hiring manager is also provided full visibility and control, while providing full transparency to human resources.

The above-described workflow, examples, embodiments, and effects are merely exemplary and provided for illustrative purposes. The workflow, examples, embodiments, and effects are not to be considered limiting or exhaustive. In this regard, a non-limiting and exemplary list of the effects is provided by FIG. 8. Further, a non-limiting and exemplary list of features and objectives is provided by FIGS. 9A, 9B, and 9C. Even further, a further workflow of an exemplary embodiment is shown by FIG. 10.

The above-described workflow, examples, embodiments, and effects increase workflow speed by providing a number of quality, verifiable candidates. The wait time to locate, review, and interview prospects is significantly reduced, thereby saving time and money as well as reducing anxiety and stress. The recruitment process further coordinates turbulence, minimizes negative results via a limited pipeline, is appropriate for all levels of candidate and hiring manager experience, and is affordable and timely for both candidates and hiring managers.

More specifically, sourcing is the most time consuming and challenging part of recruitment. Up to 50% of time is spent sourcing a candidate, not including speaking/qualifying, setting up interviews, and hiring. If one does not have a trained eye, which many professional recruiters do not, it is very difficult to find the person(s) one is looking for. Instead, most recruitment personnel send every resume w/a matching keyword to a hiring team and let them do the work.

In a job board model, an employer posts a job for which anyone can apply. There are no limits, and it's a free-for-all. Some candidates are qualified, while most are not. In this regard, it is very easy for candidates to hit the send button one thousand times. Once the employer receives these resumes, someone has to go through all of them to determine who are the candidates, are they qualified, and is time available to go further with the candidate.

On the employee side model, also known as false hope", an employee may apply to jobs hours on end, believing there is an end game, only to eventually realize that he or she spent a lot of time submitting with zero results.

On the employer side model, the employer typically does not know how else to go about hiring. The managers are busy doing what they do, the recruiters have 10-100 roles they must fill to meet expectations, and so the employer creates a job description, which is often referred to as "a detailed version of your kitchen sink", and plasters it on as many job boards as possible with no discrimination. Then, the employer waits, and gets resume after resume after resume. By the time the employer sits down to review the pile of one-hundred-plus resumes, the employer likely has another role to focus on. So, the process is started over. Meanwhile, most of the received resumes go to the "black hole" and, on chance they are right for the role because they saw VP or a specific skillset listed, it doesn't matter any-more, because the resumes are gone. Time is of the essence, and the recruiter is on to the next priority role.

The referral model is a good way to find talent that primarily will be similar to current employed talent. Referral fees are great incentives, but if the people are good, their friends typically are good and working too. While referral fees are great, it takes time to share these opportunities and convince friends to accept, similar to a full-time recruitment job. This is time most internal employees aren't willing to commit to, since they're focusing most of their efforts at their current jobs.

The agency model, or retained/contingent model, is hit or miss as to the external source of candidates depending on the provider. In the agency model, untapped networks of passive candidates, including C-levels, are great to slot into hard to find roles. However, they arrive at a premium, typically mid-senior level talent, as most companies aren't willing to pay someone to find a recent college grad. If the business has a need, and has no other options, this may be a good alternative.

Thus, the above-described workflows, examples, embodiments, and effects improve on the shortcomings of the above-described models.

Of course, those skilled in the art appreciate that the present disclosure includes various additional and alternative methods in accordance with the teachings and disclosure set forth herein. Moreover, those of ordinary skill in the art understand the various processes and methods described herein may be implemented by various computer programs and computer-readable media including executable instructions. The computer programs and computer-readable media, when executed, may implement any of the various processes, methods, or combinations thereof disclosed herein. The processes, methods, or combinations thereof may be implemented via various display screens. For example, FIGS. 11, 12, 13, 14, 15, 16, 17, 18, 19, 20, 21, 22, and 23 show various display screens of a program, record on a computer-readable medium.

Accordingly, the present disclosure provides various systems, servers, methods, media, programs, and platforms for sourcing and recruiting candidates into an interview process.

Figure 26:
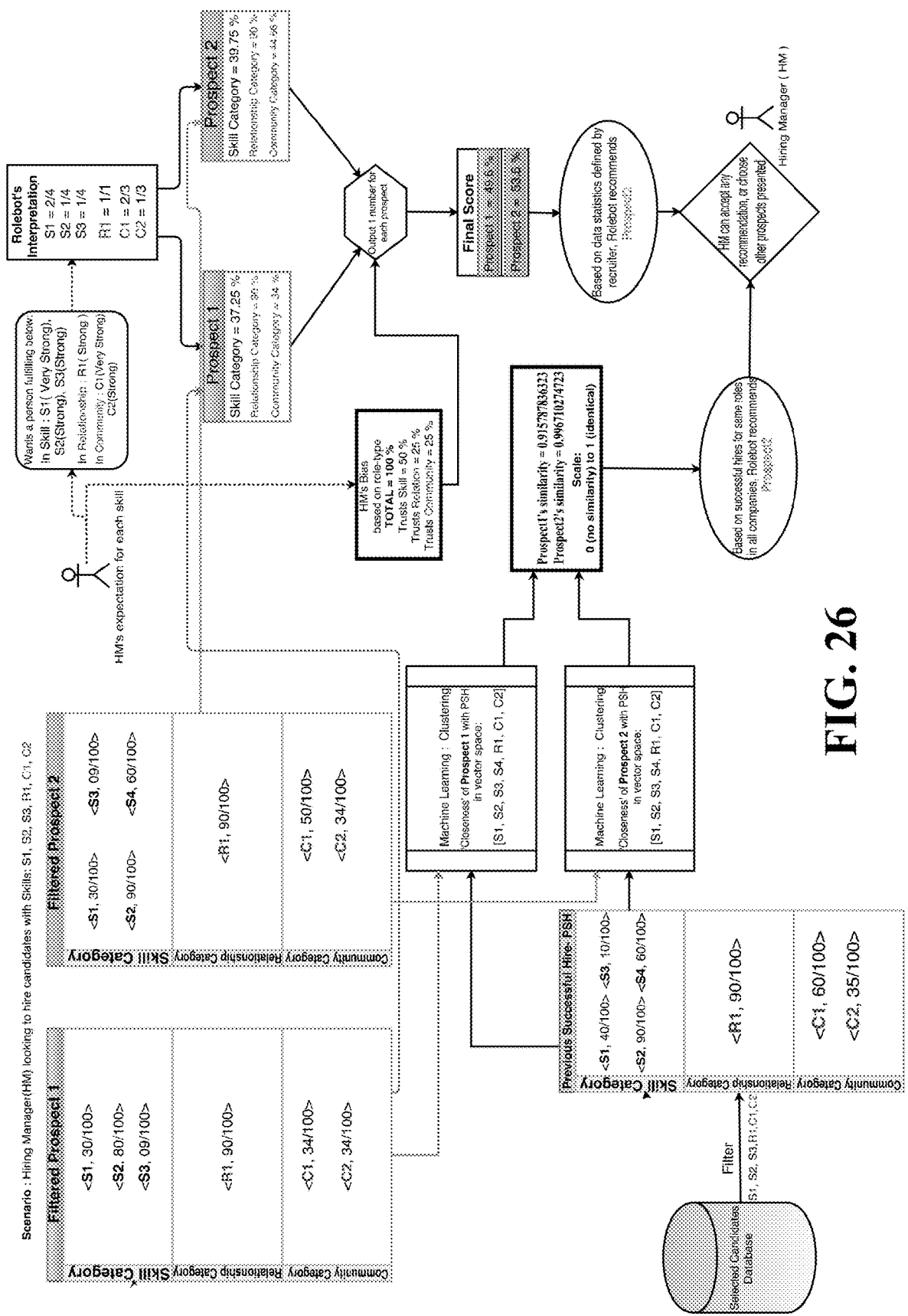
FIG. 26 shows an exemplary schematic of a search for candidate prospects according to an embodiment of the present disclosure.

FIG. 26 shows an example schematic of a candidate or prospect search according to an exemplary embodiment of the present disclosure. In the exemplary embodiment, the hiring manger 202 is looking to hire at least one candidate having Skills defined as, for example, S1, S2, S3, R1, C1, and C2. The Skills may be selected by the hiring manager 202. The Skills may be selected via drop-down menus, item-selection lists, or via any other means known and understood in the art. The Skills may additionally or alternatively be input by the hiring manger 202, or the Skills may be stored in association with a profile of the hiring manger 202. The Skills may even further be determined by the server 102. For example, the Skills may be automatically determined by the server 102 based on a position or title selected or otherwise indicated by the hiring manger 202, for which the at least one candidate is sought. The above-described examples are merely exemplary and are not meant to be limiting or exhaustive. The Skills may be determined in accordance with any of the methods or procedures described herein, or in accordance with any additional or alternative means known in the art.

The Skills may be categorized or classified under the pillars described herein. For example, Skills S1, S2, and S3 may be associated with the skill set pillar, Skill R1 may be associated with the relationship pillar, and Skills C1 and C2 may be associated with the community pillar. In this regard, the Skills are described in FIG. 26 as only being associated with three pillars. Nevertheless, it is to be known and understood that the Skills may be associated with less, more, additional, or alternative pillars. For example, among others, the exemplary candidate search may include Skills associated with the self-score pillar.

The Skills may be interpreted as a minimum set of requirements for the at least one candidate, whereas each candidate must qualify for or possess the requirement. Each candidate may be required to merely satisfy the Skill, or to have a certain level or ability with respect to the Skill. In any event, the requisite Skills may be a minimum set of requirements or a mere desired or suggested set of requirements. The Skills, which establish the criteria by which a search for the at least one candidate is conducted, may be modified statically or dynamically to control a number of the at least one candidate as the hiring manager 202 and/or the server 102 sees fit.

Upon input or determination of the Skills, pursuant to which the server 102 conducts a search for the at least one candidate, the server 102 conducts a search of the talent pool 206 as described herein, and as will be described in more detail below regarding FIG. 26.

The server finds or discovers, for example, Filtered Prospect 1 and Filtered Prospect 2. Again, Filtered Prospects 1 and 2 may be found or uncovered in accordance with any of the methods or means described herein. The number of prospects is shown and described as two for convenience. Nevertheless, it is to be known and understood that the number of prospects is not limited to such. The number of prospects which is returned may be uncapped and include all prospects which satisfy the minimum requirements of the Skills, or the number of prospects may be capped in accordance with a criterion or criteria set by the hiring manager 202 and/or the server 102.

The server 102 assigns each of Filtered Prospect 1 and Filtered Prospect 2 a score for each of the Skills. The score may be a numerical score set with respect to or without regards to a range, a ratio, a letter, a percentage, a number of hits, or any other type of score generally known and understood in the art. The scores in FIG. 26 are shown as being ratios representative of a percentage, although such scores are not to be limiting.

Filtered Prospect 1 and Filtered Prospect 2 receive a separate score for each of the Skills. Filtered Prospect 1 and Filtered Prospect 2 may additionally or alternatively receive a score for additional skills which are or are not accounted for in alternative embodiments of the method of FIG. 26. For example, in FIG. 26, a score is shown for Filtered Prospect 2 in regards to Skill S4. Nevertheless, such score is unaccounted for in the search of FIG. 26. The score for the Skill S4 may, however, be provided to the hiring manager 202 as additional information and/or may be used by the server in the machine learning algorithm which will be described below.

The hiring manager 202 may assign an expectation or strength to each of the Skills. The expectation or strength may include generic identifiers such as very strong, strong, neutral, etc. as shown in FIG. 26. In such instance, the method of FIG. 26 translates the generic identifiers into quantifiable identifiers. For example, the method may translate the generic identifiers into ratios or percentages in accordance with a weighting system of the generic identifiers. That is, each of the generic identifiers may be assigned a value, such as two for very strong, one for medium, zero for neutral, etc. Thereafter, the method determines a ratio or percentage of each skill to the whole. The ratio or percentage of each skill may be relative to the pillar or category within which the skill is associated, such as the skill set pillar, the relationship pillar, and the community pillar. Additionally or alternatively, the ratio or percentage of each skill may be relative to the Skills as a whole. In this regard, Skills may be weighted in accordance with any additional and/or alternative techniques known and understood in the art. The Skills may even be weighted by including a filter mechanism which removes, discounts, or otherwise negates outlying values of the Skills.

While the Skills are shown as including generic identifiers, e.g., weights, in FIG. 26, it should be known and understood that the Skills may include additional weights which are assigned by the hiring manager 202 or the server 102. For example, the Skills may be ranked in order of priority or assigned numerical weights. The server 102 may then translate such priority order or numerical weights into the ratios or percentages shown by FIG. 26 and/or described above. Of course, the hiring manager 202 may assign the ratios or percentages for the Skills as an alternative to the server 102 determining the ratios or percentages. The hiring manager 202 may assign the ratios or percentages in addition to, or as an alternative to, assigning the representative identifiers, such as very strong, strong, neutral, etc. In any event, the ultimate ratios or percentages of the respective Skills may be determined in accordance with any of the above-described methods, and/or in accordance with any additional or alternative methods understood in the art.

The ratios or percentages are respectively applied to the scores of the Skills to determine a single score for each pillar or skill category. For example, as shown in FIG. 26, the ratio of 2/4 is applied to S1 while the ratio of 1/4 is applied to each of S2 and S3. The same ratios or percentages are respectively applied to the scores of the Skills of each of Filtered Prospect 1 and Filtered Prospect 2 to determine overall scores for the categories or pillars, as shown in FIG. 26. However, in alternative embodiments, different ratios or percentages may be applied to the scores of the Skills of Filtered Prospect 1 and Filtered Prospect 2 to determine the overall scores for the categories or pillars. For example, if one of Filtered Prospect 1 and Filtered Prospect 2 includes a predetermined skill, or if the search of for the at least one candidate uncovers a certain trait or characteristic within one of the Skills of one of Filtered Prospect 1 and Filtered Prospect 2, such Skill may be adjusted to have a higher or lower ratio or percentage. Also, if the score for one of the Skills exceeds or is below a certain threshold score, such Skill may be adjusted to have a higher or lower ratio or percentage. The threshold score may be fixed and/or predetermined, or the threshold score may be set relative to the other Skills within the same category or pillar. In other words, if one Skill in a category or pillar differs from the other Skills in the category or pillar by a predetermined or relative amount, e.g., if the one Skill is an outlier, the ratio or percentage with which the one Skill is weighted may be increased or decreased.

Accordingly, the ratios or percentages are applied to the Skills within each category or pillar to determine an overall score for each category or pillar. The ratios or percentages may be applied individually or universally to the categories or pillars in accordance with any of the methods described above, or in accordance with any additional methods which are known and understood in the art. In any event, an overall score is determined for each category or pillar as shown FIG. 26.

Thereafter, an overall weighting is applied to the overall score of each of the categories to determine a single score for each of Filtered Prospect 1 and Filtered Prospect 1. The overall weighting which is to be applied to the overall score of each of the categories may be set in accordance with a bias of the hiring manager 202, or the overall weighting may be set by the server 102. The overall weighting may be set or applied in accordance with any of the above-discussed embodiments relating to the category or pillar weightings, or in accordance any additional known and understood methods. In any event, a single, final score is determined for each of Filtered Prospect 1 and Filtered Prospect 2. For example, the final score of Filtered Prospect 1 may be determined in accordance with the following equation:

$$1/2[2/4(30/100)+1/4(80/100)+1/4(09/100)]+1/4[1/1(90/100)]+1/4[2/3(34/100)+1/3(34/100)]=49.6\%$$

Of course, the above-values and method of determining the single, final score are merely exemplary and are not limiting.

Upon determination, the server 102 outputs the single, total score for each of Prospect 1 and Filtered Prospect 2. The server 102 may make a recommendation based on the total score alone, or based on the total score in connection with additional criteria. An example of the additional criteria by which the server 102 may make the recommendation will be described below.

The hiring manager 202 receives the single, total score for each of Filtered Prospect 1 and Filtered Prospect 2, and may proceed in accordance with any suitable manner. For example, the hiring manager 202 may choose a recommended one of Filtered Prospect 1 and Filtered Prospect 2, or the hiring manager 202 may choose a non-recommended one of Filtered Prospect 1 and Filtered Prospect 2. The hiring manger 202 may also be presented with an option for viewing or reviewing additional or alternative prospects by the same or additional criteria. For example, should the hiring manager 202 wish to expand or narrow the search, the hiring manager 202 may modify the Skills based upon which the search is conducted. As an additional example, should the hiring manager wish to modify the weights of the Skills and/or the categories or pillars, the hiring manager 202 may modify the ratios or percentages assigned thereto and be presented with an updated single, total score for each of Filtered Prospect 1 and Filtered Prospect 2 and/or additional prospects.

Upon satisfaction of the search and results, the hiring manager 202 may accept, exclude, or otherwise select each or any of Filtered Prospect 1 and Filtered Prospect 2. For example, the hiring manager 202 may proceed with the interview process for Filtered Prospect 1 and/or Filtered Prospect 2, exclude Filtered Prospect 1 and/or Filtered Prospect 2 from any future searches, or archive Filtered Prospect 1 and/or Filtered Prospect 2 for later searches. Again, these examples are merely exemplary and are not limiting or exhaustive. The hiring manager 202 may use the results of the search in accordance with any additional or alternative known methods.

In the embodiment shown by FIG. 26, the method may further include a learning process or algorithm. In such embodiment, a selected candidates database may include a list of candidates. The list of candidates may include any candidates which were previously uncovered, or the list of candidates may be limited to select candidates based on predetermined criteria. For example, the list of candidates may be limited based on candidates having certain Skills or candidates having certain scores or ratios amongst one or more of the Skills. The list of candidates may additionally or alternatively be limited to candidates having certain single scores for each pillar or skill category. In this regard, the certain scores across the Skills of the pillar or skill category may be determined by exceeding a threshold or by being in a predetermined percent relative to other candidates, such as by being in the top ten percent. Candidates which include a single score for a skill and/or a pillar or skill category which satisfies the criteria may be selected, or the candidates may be required to satisfy the criteria across a predetermined number or all of the Skills and/or the pillars or skill categories.

Additionally or alternatively to being limited by the scores for the Skills or the scores for each pillar or skill category, the list of candidates may be limited by the total score determined for each candidate, such as the total score for each of Filtered Prospect 1 and Filtered Prospect 2. In this regard, the total score may be static or dynamic. That is, the total score for each of Filtered Prospect 1 and Filtered Prospect 2 as described above may be stored in association with the prospects in the selected candidates database. Additionally or alternatively, scores for the individual Skills may be stored in association with the prospects in the selected candidates database. As a result, for each new search, a new total score may be computed for each of the stored candidates based on the input criteria of the hiring manager 202, such as the Skills selected by the hiring manager 202 and the weightings assigned thereto.

In even further embodiments, the selected candidates database may include candidates which were previously accepted, selected, or otherwise indicated by the hiring manager 202 and/or the server 102. In this regard, the selected candidates database may include previously successfully hired candidates. The hired candidates may be included upon being hired, or included after a predetermined grace period and/or when reported by the employers as being successful. The selected candidates database may even further include employees of employers or other exemplary individuals which are selected for the sole purpose as being exemplary candidates. The candidates included in the selected candidate database may be independently determined by the server 102 and/or provided by the hiring manager 202 as a point of reference.

In any event the selected candidates database includes a list of reference candidates that may be determined in accordance with any of the above described methods, or combinations thereof, and also in accordance with any alternative or additional methods which may be known and understood in the art.

The server 102 may compare the scores of the Skills, the scores of the pillars or skill categories, and/or the total scores of each of Filtered Prospect 1 and Filtered Prospect 2 with like scores of the reference candidates stored in the selected candidates database. The server 102 may compare each of Filtered Prospect 1 and Filtered Prospect 2 with all reference candidates or any subset thereof. For example, the server 102 may compare each of Filtered Prospect 1 and Filtered Prospect 2 with only those reference candidates which have scores for the Skills which are selected by the hiring manager 202, for which the search is conducted. The server 102 may additionally or alternatively compare each of Filtered Prospect 1 and Filtered Prospect 2 with only those reference candidates who have score(s) for particular Skill (s) which are selected by the hiring manager 202 and/or the server 102. The server may even further additionally or alternatively compare each of Filtered Prospect 1 and Filtered Prospect 2 with only those reference candidates who have similar score(s) for particular Skill(s) which are selected by the hiring manager 202 and/or the server 102. In even further embodiments, the subset of the reference candidates with which Filtered Prospect 1 and Filtered Prospect 2 are compared may be determined in accordance with any known and understood methods.

Filtered Prospect 1 and Filtered Prospect 2 are compared with the reference candidates, or a subset thereof, which may or may not include previously successful hires, to determine a closeness or similarity of Filtered Prospect 1 and Filtered Prospect 2 with the selected reference candidates. The closeness or similarity may be determined based on the scores of the Skills, the scores of the pillars or categories of skills, and/or the total scores in a vector space to determine a numerical value representative of the closeness or similarity on a predetermined scale. The numerical value representative of the closeness or similarity may be used by the server 102 to provide a recommendation of one of Filtered Prospect 1 and Filtered Prospect 2. The numerical value representative of the closeness or similarity may be used by the server 102 to provide the recommendation discussed above, or the numerical value representative of the closeness or similarity may be used by the server 102 to provide a confirmation of the recommendation discussed above. The numerical value representative of the closeness or similarity may or may not be presented to the hiring manager 202 such that the hiring manager 202 may or may not base his or her acceptance of any of Filtered Prospect 1 and Filtered Prospect 2 based on such closeness or similarity. For example, in an exemplary embodiment, the hiring manager may provide one or more employees or otherwise desirable or acceptable candidates as the reference candidates. Thereafter, the hiring manager 202 may accept any of Filtered Prospect 1 and Filtered Prospect 2 based on a similarity with the desirable or otherwise acceptable reference candidates. Of course, such example is merely exemplary and is not meant to be limiting.

Figure 27:
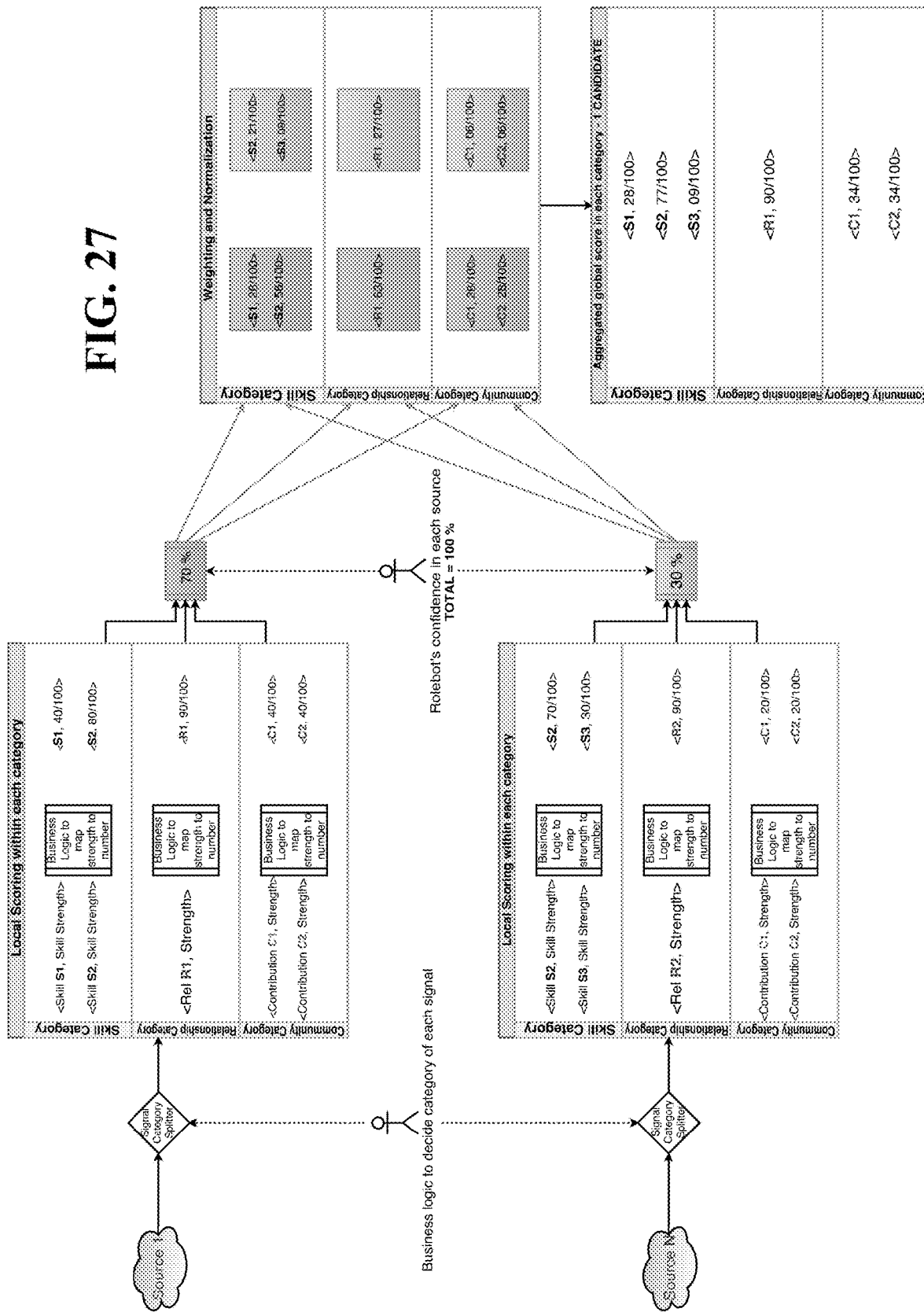
FIG. 27 shows an exemplary schematic of a search for a candidate prospect according to an embodiment of the present disclosure
Figure 28:
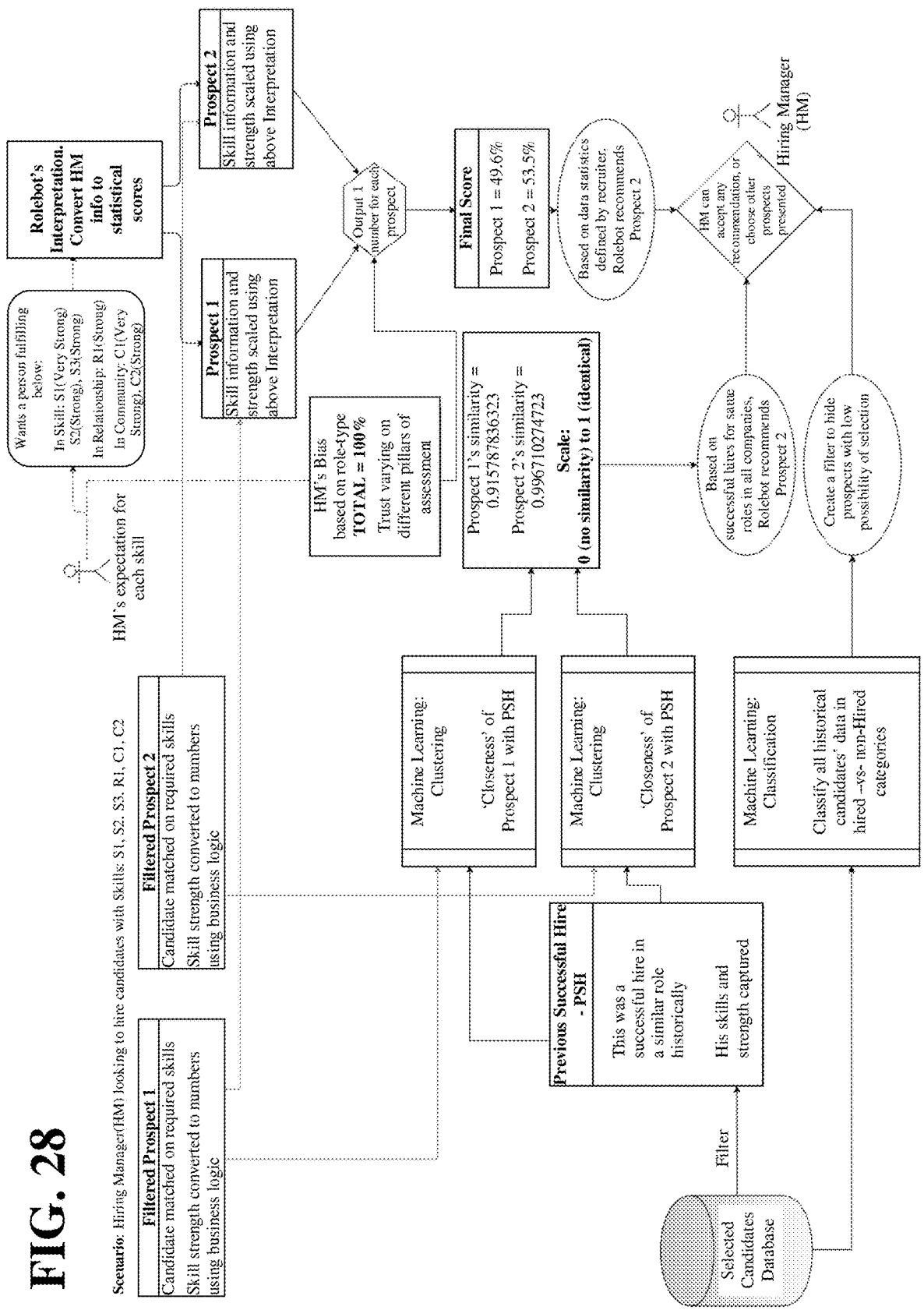
FIG. 28 shows a further exemplary schematic of a search for a candidate prospect according to an embodiment of the present disclosure.

FIG. 27 shows an exemplary schematic of an individual prospect or candidate search according to an exemplary embodiment of the present disclosure. In the exemplary embodiment, the search may be conducted pursuant to the above-mentioned Skills, e.g., S1, S2, S3, R1, C1, and C2, of FIG. 26. As described above, the Skills may be determined by the hiring manager 202, the server 102, or in accordance with any of the additional or alternative methods described herein.

The individual prospect or candidate may result in, e.g., Filtered Prospect 1 or Filtered Prospect 2. In this regard, a plurality of sources, e.g., Source 1 and Source 2, may be searched for candidates having the Skills. The searches may be conducted on websites or any additional sources as described herein. The individual prospect or candidate may be identified at one of the sources, whereupon additional sources are searched for the identified candidate. Additionally or alternatively, plural sources may be searched for a candidate in common.

In any event, for a single prospect or candidate, the plurality of sources is searched to determine scores for each of the Skills. A local score for each of the Skills may be determined for each of the sources. The local score may be determined based on the content of each source, using business logic to map the content to the local score. The business logic may be the same or different for each of the sources, and the same or different for each of the Skills within the sources. The business logic may be based on or include any of the features described herein, with the business logic mapping the content of the website to a score for each of the Skills.

In the embodiment shown in FIG. 27, the server 102 assigns each of the sources a confidence score. The confidence score may be a ratio, a percentage, or any other value described herein. The confidence score may be assigned by the server 102 as shown in FIG. 27, or the confidence score may be assigned by the hiring manager 202 in additional or alternative embodiments. In even further embodiments, the sources may not be associated with confidence scores. The confidence scores are generally assigned based on the trustworthiness or reliability of the content therein. The confidence scores may be universally applied to each of the Skills within a source, or different confidence may be applied for different Skills or pillars or categories of Skills. For example, a particular source may be trustworthy with respect to a certain Skill or pillar, but not as trustworthy with respect to another Skill or pillar.

The confidence scores are applied to the Skills for each of the sources to weight and normalize the scores for each of the Skills. For example, as shown in FIG. 27, Source 1 may have a score of 80/100 for Skill S2 and a confidence of 70%, while Source 2 may have a score of 70/100 for Skill S2 and a confidence of 30%. The resultant weighted and normalized values for the Skill S2 of Source 1 and Source 2 are 56/100 and 21/100, respectively. Of course, the above-described example is merely exemplary and not limiting or exhaustive. The scores for the Skills across the Sources may be weighted and normalized in accordance with any additional or alternative methods which are known in the art.

The weighted and normalized scores for the Skills across the Sources are aggregated to determine a total score for each Skill for the individual prospect or candidate. For example, with respect to the above-described example and as shown in FIG. 27, the weighted and normalized values for the Skill S2 of Source 1 and Source 2 of 56/100 and 21/100 are aggregated to arrive at a total score of 77/100. Again, this example is merely exemplary and not limiting or exhaustive. The aggregated scores thus arrived at for the individual prospect or candidate may then be compared with other prospects or candidates, as described with respect to FIG. 26.

Accordingly, all relevant information associated with a prospect or candidate may be pulled from various sources over the Internet. Each source adds some employment value which may quantify and explain the candidate's quality or value. Each input from each source may be a signal. Each signal is evaluated for association with, for example, one of the evaluation categories: Skill, Relationship, and Community. Business Logic is used to map the strength of each signal to a number. So, finally the system arrives at tags and their number relative on a predetermined scale, e.g., from 0-100, for each source. Based on the systems' confidence and logic from each source, a relative weight is assigned to the source, such that total number of source weights equals 100. This information is used to weigh and normalize previously mapped numbers of tags. Finally, all tags are placed together in respective categories. If any duplicate skill coming from different sources is found, it may be aggregated at this level. The end result is a set of tags and their weights being placed in set categories.

According to such features, a hiring manager may use the platform to hire candidates with technical skills, good network, and contributions to the community.

The system quantifies the above information and then filters among candidates to list filtered prospects that match set requirements. For example, for simplification purposes, assume two candidates are shortlisted as prospects. The system maps specifications of the hiring manager 202 to the shortlisted candidates and assigns each prospect a percentage in each of the pillars of evaluation, such as Skill, Relationship, and Community. These three percentages may be again combined into one number based on a bias of the hiring manager 202 to each of the pillars. Candidates are sorted and presented as result. The system thereafter compares all prospects matching requirements of the hiring manager with historical data of successful hires for similar roles. All prospects are then ranked based on their similarity with successful ones. The result is integrated with the previously mentioned statistical solution. Finally, the hiring manager 202 has the flexibility to choose any of the recommendations or pick his or her own.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system for sourcing and recruiting candidates into an interview process, the system comprising:
   a processor;
   a database that stores at least one predetermined website, the predetermined website being in a search area of a network; and a memory including instructions that, when executed by the processor, cause the processor to perform operations including:
    receiving, via an interface, a talent description for conducting a search for at least one candidate, the talent description including at least one search criterion;
    determining the search area of the network based on the at least one search criterion, the search area of the network defining a talent pool, the search area including the at least one predetermined website;
    first identifying users of the at least one predetermined website, the talent pool consisting of the users of the at least one predetermined website;
    searching data from the at least one predetermined website in the search area of the network based on the at least one search criterion, the data including content posted by the users at the at least one predetermined website, each piece of the content which is posted by the users being associated with one of the users;
    second identifying, for a first user of the users, plural pieces of the content posted by the first user;
    third identifying, for the first user, metadata associated with the plural pieces of the content posted by the first user to determine whether each of the plural pieces of the content is to be aggregated and evaluated in association with the first user, and filtering the plural pieces of the content posted by the first user based on results of the third identifying;
    aggregating and evaluating filtered pieces of the content posted by the first user based on the at least one search criterion to identify the first user as a first candidate from the talent pool;
    displaying or transmitting information of the first candidate via the interface; and
    arranging an interview with the first candidate,
wherein the filtering includes disregarding one of the plural pieces of the content posted by the first user based on the results of the third identifying,
the at least one predetermined website is stored in the database in advance of the searching of the data from the at least one predetermined website,
the database stores at least one application programming interface for the at least one predetermined website in the search area of the network, the at least one application programming interface facilitating the searching of the at least one predetermined website for the data, and
the operations further include:
    after identifying the first candidate from the talent pool, determining a profile of the first candidate;
    identifying a previously unidentified location of the network from the profile of the first candidate, the previously unidentified location relating to the at least one search criterion; and
    updating the database to store the previously unidentified location of the network.

2. The system according to claim 1, wherein the search area of the network is further determined based on a geographic location.

3. The system according to claim 2, wherein the data from the at least one predetermined website in the search area of the network is evaluated based on a sliding scale relationship with the geographic location, portions of the talent pool being further from the geographic location being evaluated for higher qualities than portions of the talent pool being closer to the geographic location.

4. The system according to claim 1, wherein the database is updated to store the previously unidentified location of the network in association with a tag based on the at least one criterion.

5. The system according to claim 1, wherein
    the database is updated to store the previously unidentified location of the network in association with a priority score or a temporary label, and
    the operations further include:
        increasing the priority score or removing the temporary label in response to identifying a second candidate which has an additional profile which identifies the previously unidentified location of the network.

6. The system according to claim 1, wherein the database stores the at least one location as a domain name, hostname, uniform resource locator, or website.

7. The system according to claim 1, wherein the operations further include:
    wherein the talent pool is defined as the users of the at least one predetermined website in the search area of the network.

8. The system according to claim 7, wherein the operations further include:
    filtering or limiting the users of the at least one predetermined website based on the at least one search criterion or a geographic location,
    wherein the data from the at least one predetermined website in the search area of the network is search based on the at least one search criterion and a filtered or limited set of the users.

9. The system according to claim 1, wherein the operations further include:
    identifying timestamps associated with the plural pieces of the content posted by the first user; and
    further filtering the plural pieces of the content posted by the first user based on the timestamps.

10. The system according to claim 1, wherein the operations further include:
    identifying locations associated with the plural pieces of the content posted by the first user; and
    further filtering the plural pieces of the content posted by the first user based on the locations.

11. The system according to claim 1, wherein the data searched from the at least one predetermined website is evaluated based on a plurality of pillars.

12. The system according to claim 1, wherein
    the talent description is received from a hiring manager via the interface, and
    the operations further include:
        arranging the interview between the hiring manager and the at least one candidate.

13. The system according to claim 1, wherein the at least one predetermined website in the search area of the network is searched, based on the at least one search criterion, for at least one of questions posted and code posted.

14. The system according to claim 1, wherein the data that is searched from the at least one predetermined website includes actions of the users of the at least one predetermined website.

15. A method for sourcing and recruiting candidates into an interview process, the method comprising:
    receiving, via an interface, a talent description for conducting a search for at least one candidate, the talent description including at least one search criterion;

determining, by a processor, a search area of a network based on the at least one search criterion, the search area of the network defining a talent pool, the search area including at least one predetermined website;

first identifying users of the at least one predetermined website, the talent pool consisting of the users of the at least one predetermined website;

searching, by the processor, data from the at least one predetermined website in the search area of the network based on the at least one search criterion, the data including content posted by the users at the at least one predetermined website, each piece of the content which is posted by the users being associated with one of the users;

second identifying, by the processor and for a first user of the users, plural pieces of the content posted by the first user;

third identifying, by the processor and for the first user, metadata associated with the plural pieces of the content posted by the first user to determine whether each of the plural pieces of the content is to be aggregated and evaluated in association with the first user, and filtering, by the processor, the plural pieces of the content posted by the first user based on results of the third identifying;

aggregating and evaluating, by the processor, filtered pieces of the content posted by the first user based on the at least one search criterion to identify the first user as a first candidate from the talent pool;

displaying or transmitting, via the interface, information of the first candidate; and arranging an interview with the first candidate, wherein the filtering includes disregarding one of the plural pieces of the content posted by the first user based on the results of the third identifying, the at least one predetermined website in the search area of the network is stored in a database, the at least one predetermined website is stored in the database in advance of the searching of the data from the at least one predetermined website, at least one application programming interface is stored in the database for the at least one predetermined website in the search area of the network, the at least one application programming interface facilitating the searching of the at least one predetermined website for the data, and the method further comprises:
    after identifying the first candidate from the talent pool, determining a profile of the first candidate;
    identifying a previously unidentified location of the network from the profile of the first candidate, the previously unidentified location relating to the at least one search criterion; and
    updating the database to store the previously unidentified location of the network.

16. A non-transitory computer-readable medium including a set of instructions for sourcing and recruiting candidates into an interview process that, when executed by a computer, causes the computer to perform operations comprising:
    receiving, via an interface, a talent description for conducting a search for at least one candidate, the talent description including at least one search criterion;
    determining a search area of a network based on the at least one search criterion, the search area of the network defining a talent pool, the search area including at least one predetermined website;
    first identifying users of the at least one predetermined website, the talent pool consisting of the users of the at least one predetermined website;
    searching data from the at least one predetermined website in the search area of the network based on the at least one search criterion, the data including content posted by the users at the at least one predetermined website, each piece of the content which is posted by the users being associated with one of the users;
    second identifying, for a first user of the users, plural pieces of the content posted by the first user;
    third identifying, for the first user, metadata associated with the plural pieces of the content posted by the first user to determine whether each of the plural pieces of the content is to be aggregated and evaluated in association with the first user, and filtering the plural pieces of the content posted by the first user based on results of the third identifying;
    aggregating and evaluating filtered pieces of the content posted by the first user based on the at least one search criterion to identify the first user as a first candidate from the talent pool; and
    displaying or transmitting information of the first candidate via the interface; and
    arranging an interview with the first candidate,
    wherein the filtering includes disregarding one of the plural pieces of the content posted by the first user based on the results of the third identifying,
    the at least one predetermined website in the search area of the network is stored in a database,
    the at least one predetermined website is stored in the database in advance of the searching of the data from the at least one predetermined website,
    at least one application programming interface is stored in the database for the at least one predetermined website in the search area of the network, the at least one application programming interface facilitating the searching of the at least one predetermined website for the data, and
    the operations further comprise:
        after identifying the first candidate from the talent pool, determining a profile of the first candidate;
        identifying a previously unidentified location of the network from the profile of the first candidate, the previously unidentified location relating to the at least one search criterion; and
        updating the database to store the previously unidentified location of the network.

\* \* \* \* \*